United States Patent
Shimomura

(10) Patent No.: US 9,807,676 B2
(45) Date of Patent: Oct. 31, 2017

(54) FREQUENCY NOTIFYING DEVICE, WIRELESS DEVICE, MANAGEMENT DEVICE AND METHOD

(71) Applicant: FUJITSU LIMITED, Kawasaki-shi, Kanagawa (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 312 days.

(21) Appl. No.: 14/611,666

(22) Filed: Feb. 2, 2015

(65) Prior Publication Data
US 2015/0148090 A1     May 28, 2015

Related U.S. Application Data

(63) Continuation of application No. PCT/JP2012/070706, filed on Aug. 14, 2012.

(51) Int. Cl.
| | |
|---|---|
| *H04W 48/14* | (2009.01) |
| *H04W 72/04* | (2009.01) |
| *H04W 16/14* | (2009.01) |
| *H04W 72/08* | (2009.01) |

(52) U.S. Cl.
CPC .......... *H04W 48/14* (2013.01); *H04W 16/14* (2013.01); *H04W 72/0453* (2013.01); *H04W 72/08* (2013.01)

(58) Field of Classification Search
CPC combination set(s) only.
See application file for complete search history.

(56) References Cited

U.S. PATENT DOCUMENTS

| | | |
|---|---|---|
| 2010/0202387 A1 | 8/2010 | Sawai et al. |
| 2011/0199965 A1 | 8/2011 | Ariyoshi et al. |
| 2012/0195270 A1 | 8/2012 | Kang et al. |

(Continued)

FOREIGN PATENT DOCUMENTS

| | | | |
|---|---|---|---|
| FI | WO 2014007825 A1 * | 9/2014 | ............ H04W 72/04 |
| JP | 2007-088940 | 4/2007 | |
| JP | 2010-206780 | 9/2010 | |

(Continued)

OTHER PUBLICATIONS

Stevenson et al., "IEEE 802.22: The First Cognitive Radio Wireless Regional Area Network Standard", IEEE Communications Magazine, pp. 130-138, vol. 47, No. 1, IEEE Service Center, Piscataway, NJ (US), Jan. 2009.

(Continued)

*Primary Examiner* — Ankur Jain
*Assistant Examiner* — Zhitong Chen
(74) *Attorney, Agent, or Firm* — Myers Wolin, LLC

(57) ABSTRACT

The frequency notifying device includes: a processor configured to store usable frequencies containing a restricted frequency being restricted in use thereof by radio equipment in a predetermined communication area and a frequency not being restricted in use thereof by the radio equipment in the communication area; and notify the radio equipment, in the communication area, of a signal for requesting the radio equipment to check whether the restricted frequency is usable or not before performing a communication using the restricted frequency when notifying the radio equipment of the usable frequency.

2 Claims, 18 Drawing Sheets

(56) References Cited

U.S. PATENT DOCUMENTS

2013/0109403 A1* 5/2013 Kim .................. H04W 16/14
455/454

FOREIGN PATENT DOCUMENTS

| | | |
|---|---|---|
| JP | 2011-176506 | 9/2011 |
| JP | 2012-147206 | 8/2012 |
| WO | 2009/084465 | 7/2009 |
| WO | 2011/136560 A2 | 11/2011 |

OTHER PUBLICATIONS

Extended European search report with the supplementary European search report and the European search opinion issued for corresponding European Patent Application No. 12891405.8 dated Jul. 8, 2015.
S.Haykin, "Cognitive Radio: Brain-Empowered Wireless Communications", IEEE Journal on Selected Areas in Communication, vol. 23, No. 2, Feb. 2005.
Federal Communications Commission (FCC) 10-174, "Second Memorandum Opinion and Order" Released: Sep. 23, 2010.
International Search Report for corresponding International Patent Application No. PCT/JP2012/070706 dated Sep. 25, 2012.

* cited by examiner

| (LATITUDE, LONGITUDE) | FREQUENCY | MAXIMUM ALLOWABLE TRANSMISSION POWER [mW] | | | |
|---|---|---|---|---|---|
| | | ANTENNA HEIGHT <h1 | h1 ≦ ANTENNA HEIGH <h2 | ... | h(L-1) ≦ ANTENNA HEIGH <h(L) |
| (x1, y1) | f1 | 100 | 100 | ... | 20 |
| | f2 | 40 | 20 | ... | — |
| | ... | ... | ... | ... | ... |
| | fK | 60 | 40 | ... | — |
| (x1, y2) | f1 | | | | |
| | f2 | | | | |
| | ... | | | | |
| | fK | | | | |
| ... | ... | ... | ... | ... | ... |
| (xM, yN) | f1 | | | | |
| | f2 | | | | |
| | ... | | | | |
| | fK | | | | |

FREQUENCY NOTIFYING DEVICE, WIRELESS DEVICE, MANAGEMENT DEVICE AND METHOD

CROSS-REFERENCE TO RELATED APPLICATION

This application is a continuation application of International Application PCT/JP2012/070706 filed on Aug. 14, 2012 and designated the U.S., the entire contents of which are incorporated herein by reference.

FIELD

The present invention relates to a wireless communication device, an information processing apparatus pertaining to management of wireless communications, and an information processing method.

BACKGROUND

Over the recent years, wireless traffics have continued to rapidly increase, and there have been ever-increasing demands for frequencies as finite resources. As one of means to effectively utilize the frequencies, an examination about a cognitive radio technology to perform communications by cognizing an ambient radio environment is in progress (refer to, e.g., Non-Patent document 1). For example, attentions are focused on white space (or frequency shared) cognitive radio. The white space cognitive radio is defined as a function to perform communications by use of a free space of frequencies corresponding to time, locations, etc. without interfering a system enabled to employ preferentially the respective frequencies. This free space of the frequencies is called a white space. For example, the US FCC (Federal Communications Commission) announced a final rule (Non-Patent document 2) concerning communications-oriented utilization of a TV white space (TVWS) in September of 2010 in U.S.A.

In a white space cognitive radio technology, the system having a priority to use the frequencies is referred to as a prima system or a primary system. A system, which detects and uses the white space of a frequency band allocated to the primary system, is referred to as a second system or a secondary system. In the case of the TVWS, TV broadcasting becomes the primary system. Broad frequency bands such as UHF bands are allocated to the TV broadcastings, in which an actually used frequency, e.g. a physical TV channel, differs depending on a local area. Further, the TVWS has a characteristic of being small in fluctuation in a timewise direction. A database access method adopted in the FCC rule is regarded prospective as a method of detecting such a quasi-static TVWS. The database access method involves storing, in a database configured on a network, radio zone information of the primary system and usable white spaces of the secondary system, the WS being obtained based on a counter primary system interference avoidance standard. The secondary system desiring to use the white space refers to the database with self positional information being used (as query information), thus obtaining a list of free frequencies usable by the secondary system itself. The free frequencies are also referred to as white space frequencies.

Patent Document

[Patent document 1] Japanese Laid-Open Patent Publication No. 2011-176506

[Patent document 2] Japanese Laid-Open Patent Publication No. 2007-88940

Non-Patent Document

[Non-Patent document 1] S. Haykin, "Cognitive radio: Brain-empowered wireless communications", IEEE Journal on Selected Areas in Communications, Vol. 23, No. 2, February 2005

[Non-Patent document 2] FCC 10-174, "Second Memorandum Opinion and order", Sep. 23, 2010

SUMMARY

One aspect of an embodiment of the disclosure is exemplified by a frequency notifying device. The frequency notifying device includes: a processor configured to store usable frequencies containing a restricted frequency being restricted in use thereof by radio equipment in a predetermined communication area and a frequency not being restricted in use thereof by the radio equipment in the communication area; and notify the radio equipment, in the communication area, of a signal for requesting the radio equipment to check whether the restricted frequency is usable or not before performing a communication using the restricted frequency when notifying the radio equipment of the usable frequency.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 12 is a diagram illustrating a WS database;

DESCRIPTION OF EMBODIMENTS

A master-slave system can be exemplified as a communication system utilizing the free frequencies. In the master-slave system, a master device accesses the database, thereby acquiring the list of free frequencies usable for the communication. On the other hand, the slave device performs the communications with the master device by use of the list of free frequencies provided from the master device.

However, the master device and the slave device are different in terms of a degree of affecting the primary system. For example, the free frequencies usable by the master device are different from the free frequencies usable by the slave device as the case may be. Therefore, such a case exists that the master device and the slave device does not sufficiently utilize the free frequencies in the communications.

A communication system according to a best mode (which will hereinafter be referred to as an embodiment) for carrying out the present invention will hereinafter be described with reference to the drawings. A configuration of the following embodiment is an exemplification, and the present invention is not limited to the configuration of the embodiment.

Figure 1:
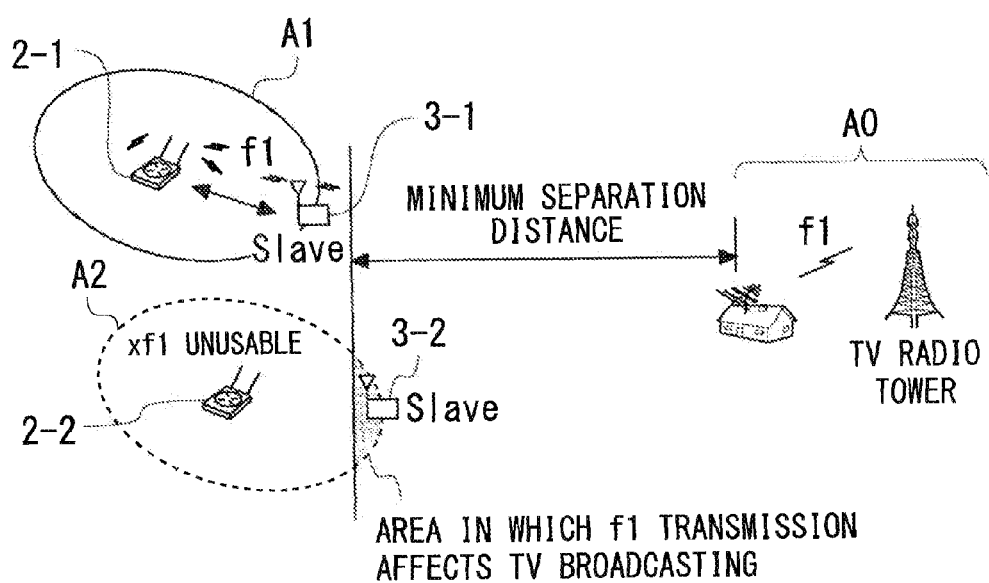
FIG. 1 is a diagram illustrating a cognitive communication system utilizing a white space (which will hereinafter be abbreviated WS)

FIG. 1 illustrates a cognitive communication system utilizing a white space (which will hereinafter be abbreviated to WS). FIG. 1 depicts a relationship between a TV broadcasting service area A0 of a primary system and communication areas A1, A2 of a secondary system. FIG. 1 further depicts a master-slave system by way of the cognitive communication system utilizing the WS.

In FIG. 1, a master device 2-1 performs communications with a slave device 3-1 by use of a WS frequency being usable in the communication area A1 throughout. Therefore, in the communication area A1, the slave device 3-1 can transmit by using an as-is WS frequency being employed by the master device 2-1. Namely, the master device 2-1 and the slave device 3-1 are away at a minimum separation distance or longer from the TV broadcasting service area A0 using, e.g., a frequency f1. Accordingly, the master device 2-1 and the slave device 3-1 can perform mutual communications by use of the frequency f1. The minimum separation distance is one example of a distance provided for preventing the communications in the communication area A1 between the master device 2-1 and the slave device 3-1 from interfering the TV broadcasting service area A0.

Incidentally, the WS frequencies differ depending on a location and are therefore usable also in a segment of the communication area of the master device, and there are some WS frequencies with restrictions in terms of use in the area segment. For example, in a segment of a communication area A2 in FIG. 1, the communications using the frequency f1 between the master device 2-2 and the slave device 3-2 interfere with TV broadcasting. Therefore, in the communication area A2, when trying to eliminate the interference with the TV broadcasting, the master device 2-2 is disabled from using the frequency f1.

It is now assumed that, e.g., the communication area A2 is a communication area not interfering with the TV broadcasting service area A0 of the primary system even when the master device 2-2 transmits radio signals having the frequency f1. When a distance between the communication area A2 and the TV broadcasting service area A0 is shorter than the minimum separation distance, however, the interference may occur. For instance, in a segmental area with hatching, closer to the TV broadcasting service area A0, of the communication area A2, when the slave device 3-2 transmits the radio signal of the frequency f1 to a master device 2-2, a situation may occur, which does not satisfy an interference standard. Hence, in the communication area A2, the master device 2-2 does not simply set the frequency f1 to be the usable WS frequency.

Note that the master devices 2-1, 2-2 and the slave devices 3-1, 3-2 are assumed to have the same level of transmission power and the same antenna height in FIG. 1. Consequently, in FIG. 1, the same minimum separation distance not affecting the TV broadcasting is applied to the master devices 2-1, 2-2 and the slave devices 3-1, 3-2.

Such being the case, Example 1 will exemplify a communication system configured to enhance a possibility that the master device 2-2 can perform the communications with the slave device 3-2 by use of the frequency f1 in a communication area like, e.g., the communication area A2 covering the segmental area in which a distance from the primary system is shorter than the minimum separation distance. The present communication system exhibits an effect of increasing the WS frequencies to a greater degree at the point having the same distance from the primary system than by the conventional systems. Further, the present communication system exhibits an effect of expanding the communication area in which the same WS frequency can be used.

Example 1

Figure 2:
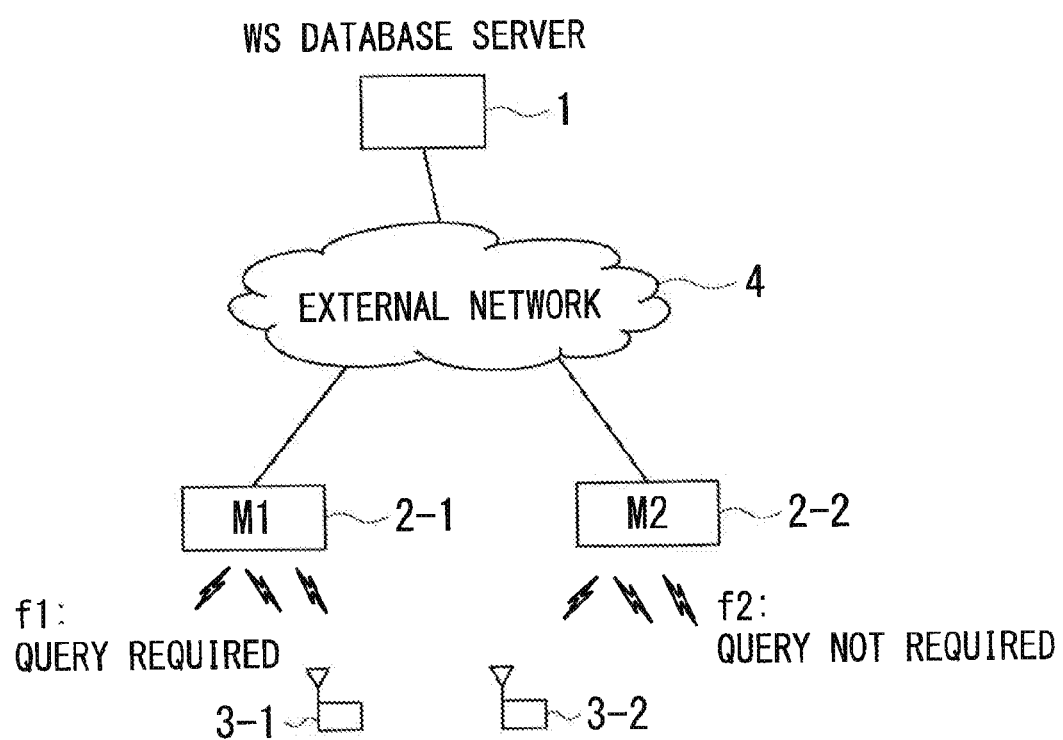
FIG. 2 is a diagram illustrating an example of architecture of the communication system.

A communication system according to Example 1 will hereinafter be described with reference to the drawings in FIGS. 2 through 15. FIG. 2 is a diagram illustrating an example of architecture of the present communication system. Note that the communication system includes, as depicted in FIG. 1, a WS database server 1, the master devices 2-1, 2-2, etc. and the slave devices 3-1, 3-2, etc. Note that the master devices 2-1, 2-2, etc., when generically termed, are simply referred to as the master device(s) 2. Moreover, the slave devices 3-1, 3-2, etc., when generically termed, are simply referred to as the slave device(s) 3.

The WS database server 1 provides the WS frequencies corresponding to the locations and the time to the master device 2 via an external network 4, e.g., a public network. Herein, the external network 4 is a network other than the network via which the communications are performed by using the WS frequency between the master device 2 and the slave device 3. The external network 4 is the public network such as the Internet. However, the external network 4 may also be a network, e.g., a cellular network that uses a frequency different from the frequency used for, e.g., the primary system. The master devices 2-1, 2-2, etc. build up a communication network with the slave devices 3-1, 3-2, etc. in a way that uses the WS frequencies provided from the WS database server 1.

The master device 2 retains, on a main storage device, the WS frequencies transmittable over the entire self-communication-area as candidate of the frequencies usable by the slave device 3, and information on the WS frequencies transmittable only in a segmental area. The master device 2 transmits, to the slave device 3, the information on the candidate of the frequencies (which will hereinafter be termed the candidate frequencies) usable by the slave device 3. In Example 1, on the occasion of transmitting the candidate frequencies, the master device 2 requests the slave device 3 to previously check whether or not the candidate frequencies are usable in an existing position when the slave device 3 uses the candidate frequencies. Namely, the master device 2 transmits instruction information for making a request for the previous check when transmitting the candidate frequencies.

The slave device 3 receives the instruction information on the WS frequencies, thereby recognizing the request for querying about whether or not the candidate frequencies are usable in the existing position upon using the candidate frequencies. Then, the slave device 3 queries the WS database server 1 by use of the frequency excluding the candidate frequencies requested to be previously checked in the instruction information. Then, the slave device 3 uses the frequency confirmed to be usable in the existing position by the WS database server 1. Herein, "the use of the frequency excluding the candidate frequencies" connotes using, e.g., the cellular network.

Furthermore, to be specific, the master device 2 inputs a self existing position to the WS database server 1 via, e.g., the external network 4. On the other hand, the WS database server 1 creates a list of usable WS frequencies usable for the master device 2 to transmit on the basis of positional information, transmission power, an antenna gain and an antenna height of the master device 2, and notifies the master device 2 of this list. The master device 2 acquires the list of usable WS frequencies through a procedure described above. Then, the master device 2 selects the WS frequency for use from the list of usable WS frequencies, and uses the selected frequency in the self communication network.

The communication area, in which the slave device 3 can receive a signal from the master device 2 without any error, is determined from the transmission power, the antenna gain and the antenna height of the master device 2 and reception power usage of the slave device. The following description will be made on the assumption that the communication area is the area in which the slave device 3 can receive the signal from the master device 2 without any error.

The master device 2 notifies the WS database server 1 of the communication area having the selected WS frequency together with the information of the slave device 3. Thereupon, the WS database server 1 determines based on the information of the slave device 3 whether the WS frequency notified from the master device 2 is the frequency usable in the communication area throughout or the frequency usable in the segment of the communication area. Then, the WS database server 1 transmits a result of the determination back to the master device 2. Through the procedure described above, the master device 2 receives the information about whether the WS frequency is the frequency usable in the communication area throughout or the frequency usable in the segment of the communication area.

Figure 3:
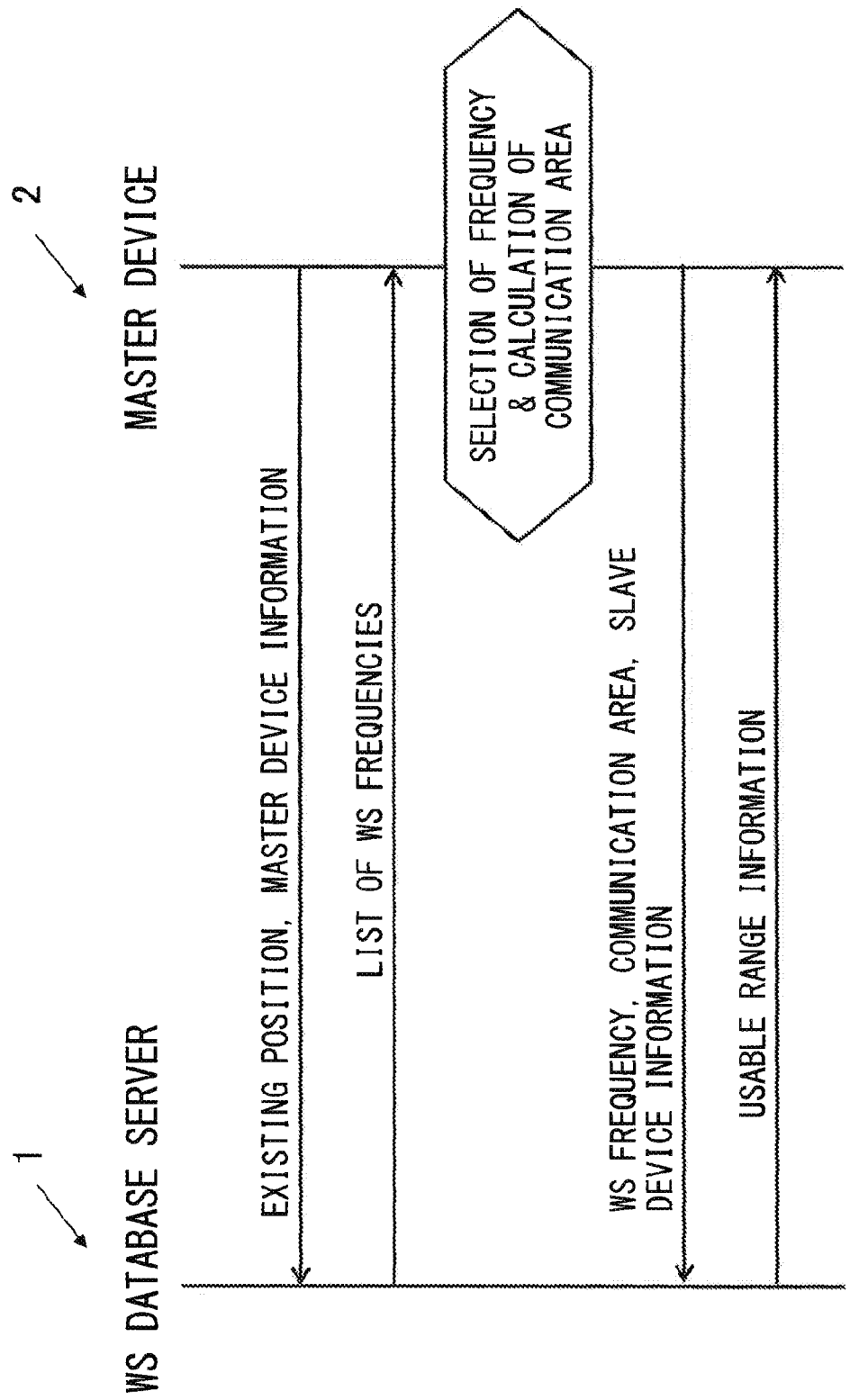
FIG. 3 is a diagram illustrating a communication sequence between a master device and a WS database server.

FIG. 3 illustrates a communication sequence by which the master device 2 acquires the list of usable WS frequencies, a usable range of the WS frequencies contained in the list and a relationship between the WS frequencies and the communication areas from the WS database server 1. For example, the master device 2 transmits the existing position of the master device 2 and master device information to the WS database server 1 via the external network 4. Herein, the master device information is information indicating the transmission power, the antenna height, etc. of the master device 2. The master device information can be said to be the information about a degree of how much the transmission of the WS frequency from the master device 2 affects the primary system. Parameters contained in the master device information determine the minimum separation distance at which to be distanced from the primary system, and determine also the usable WS frequencies. For instance, in the communication area being away at the minimum separation distance or longer from the TV broadcasting service area A0 illustrated in FIG. 1, the WS database server 1 notifies the master device 2 of the list of WS frequencies being transmittable in the communication area throughout via the external network 4.

On the other hand, the WS frequencies usable for the transmission by the slave device 3 depend on the transmission power and the antenna height of the slave device 3, etc. Therefore, the master device 2 selects the WS frequency from the notified list of WS frequencies being transmittable in the communication area throughout. Further, the master device 2 calculates the communication area in which to perform the communications with the slave device 3. Then, the master device 2 requests the WS database server 1 to check the usable range by transmitting the selected WS frequency, the calculated communication area and slave device information to the server 1. Herein, the slave device information contains transmittable power etc. of the slave device 3. The slave device information can be said to be information about a degree of how much the transmission of the WS frequency from the slave device 3 affects the primary system. The slave device information is one example of information about a degree of how much a wireless device affects other wireless communications.

Thereupon, the WS database server 1 determines by use of the communication area and the slave device information whether the WS frequency is the frequency usable in the communication area throughout or the frequency usable in the segment of the communication area. Then, the WS database server 1 transmits, back to the master device 2 via the external network 4, a determined result of the determination as to the WS frequency requested from the master device 2 or the information on the usable range of the WS frequencies etc.

Note that when a type of the slave device 3 is determined from a type of master device 2 on the basis of standards etc. and when the WS database server 1 grasps a relationship therebetween, the master device 2 does not transmits the information of the slave device 3 to the database as in FIG. 3.

Figure 4:
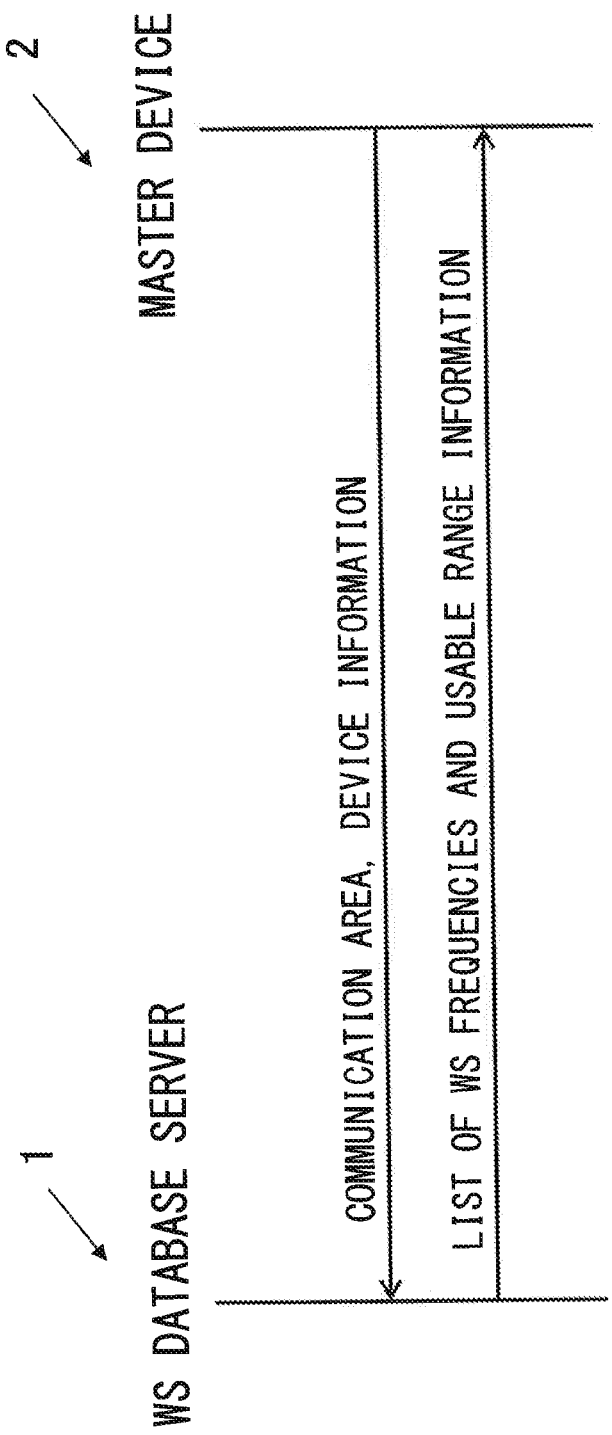
FIG. 4 is a diagram illustrating the communication sequence between the master device and the WS database server.

FIG. 4 illustrates another communication sequence by which the master device 2 acquires a relationship between the usable WS frequencies and the usable range thereof from the WS database server 1. As in FIG. 4, the master device 2 may notify the WS database server 1 of the communication area range together with information on the secondary devices (the master device 2, the slave device 3), and may acquire the WS frequencies usable within the communication area and the usable range thereof from the WS database server 1. In this case, the WS database server 1 may notify of the WS frequency having a broadest usable range in the usable WS frequencies and also the usable range thereof. The notification of the WS frequencies in the broadest usable range enables the WS database server 1 to reduce a quantity of information to be transmitted as compared with the notification of the usable range of all the frequencies in the frequency list.

The master device 2 selects the frequency to be used from the list of usable WS frequencies, and notifies the slave device 3 of the selected frequency. When notifying of the WS frequency being restricted in terms of the range usable for the slave device 3 to transmit in the usable WS frequencies, the master device 2 reports, to the slave device 3, the instruction information to make a request for checking whether or not the frequency is usable in the existing position of the slave device 3. Note that in order to make the request for checking whether or not the frequency is usable in the existing position, the master device 2 may use, e.g., a flag called an "access restriction flag". The master device 2 sets ON the flag when requesting the slave device 3 for a query but sets OFF the flag whereas when not requesting.

There is only one usable WS frequency as the case maybe, and hence a time division duplexing method is considered as a multiplexing communication method between the master device 2 and the slave device 3. The master device 2 reports an access restriction flag related to the frequency being used. The slave device 3 receives the signal from the master device 2 requests, when the flag is OFF, the master device 2 to establish a connection by use of the frequency concerned, thus starting the communications. Whereas when the flag is ON, the slave device 3 accesses the WS database server 1 via the network, e.g., the cellular network using the frequency other than the relevant WS frequency, and confirms that the relevant WS frequency is usable in the existing position. Then, the slave device 3, after confirming that the WS frequency is usable, performs the communications with the master device 2 by use of the confirmed WS frequency.

It may be, however, sufficient that the slave device 3 unable to grasp the self position or the slave device 3 not having any means to use the frequency other than the relevant frequency uses the frequency with the flag being OFF.

Figure 5:
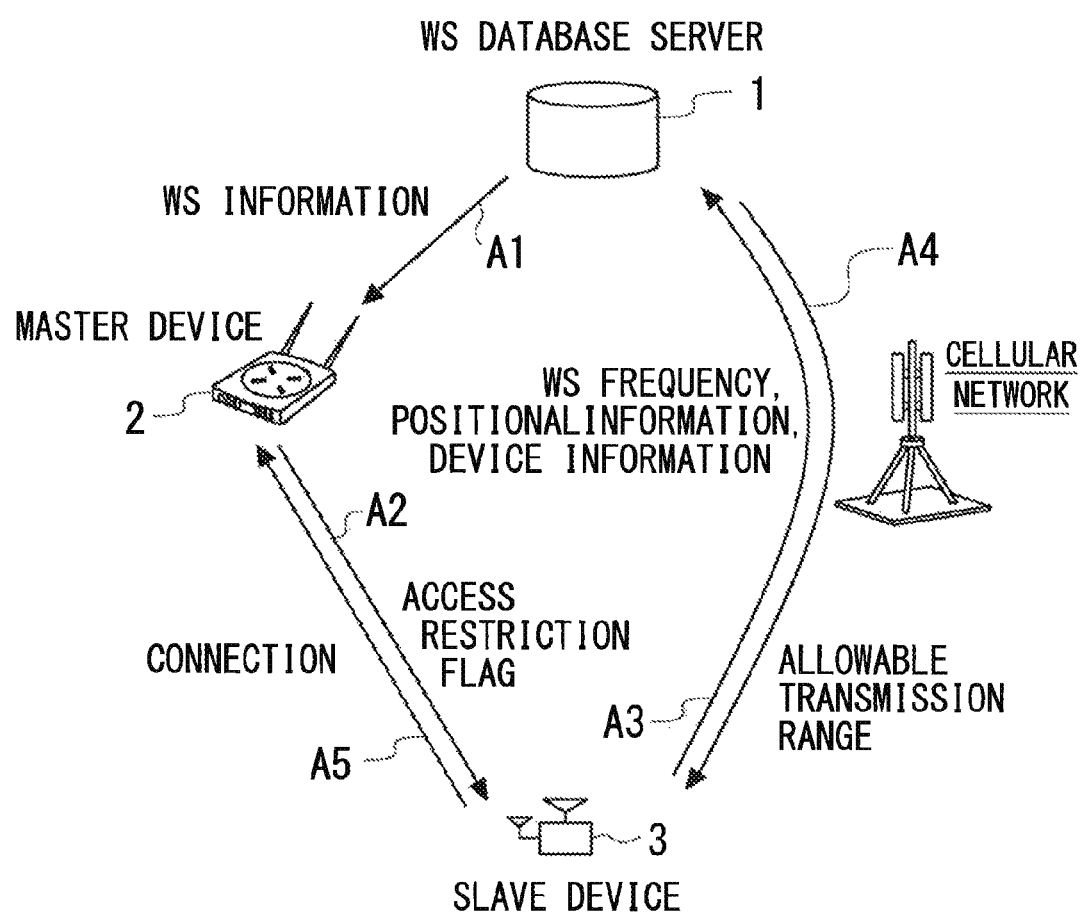
FIG. 5 is a diagram illustrating a signal flow in which a slave device accesses the WS database server via a cellular network.

FIG. 5 illustrates a flow of the signal when the slave device 3 accesses the WS database server 1 via the cellular network. In an example of FIG. 5, a procedure used for the master device 2 to acquire the list of WS frequencies from the WS database server 1 is the same as in the case of FIG. 3 or 4 (arrow line A1). Next, the master device 2 reports, to the slave device 3 within the communication area, the WS frequency restricted in terms of the usable range by the slave device 3 in the list of WS frequencies together with the access restriction flag (arrow line A2).

Subsequently, the slave device 3 accesses the WS database server 1 via the cellular network. Namely, the slave device 3 transmits the WS frequency, the positional information of the slave device 3, the slave device information, etc. to the WS database server 1, and checks whether or not the WS frequency informed by the master device 2 is usable also in the position of the slave device 3 (arrow line A3). Then, the WS database server 1 transmits information about whether the WS frequency requested to be checked is usable or not back to the slave device 3 via the cellular network (arrow line A4). Alternatively, another example is that the slave device 3 transmits the positional information and the slave device information to the WS database server 1, and the WS database server 1 transmits back the usable WS frequency in that position. The slave device 3 selects the WS frequency informed from the master device 2, the WS frequency coinciding with any one of the WS frequencies transmitted back from the WS database server 1.

The slave device 3 connects with the master device 2 by use of the radio signal having the already-confirmed WS frequency after confirming that the WS frequency is usable via the cellular network (arrow line A5).

<Device Configuration>

Figure 6:
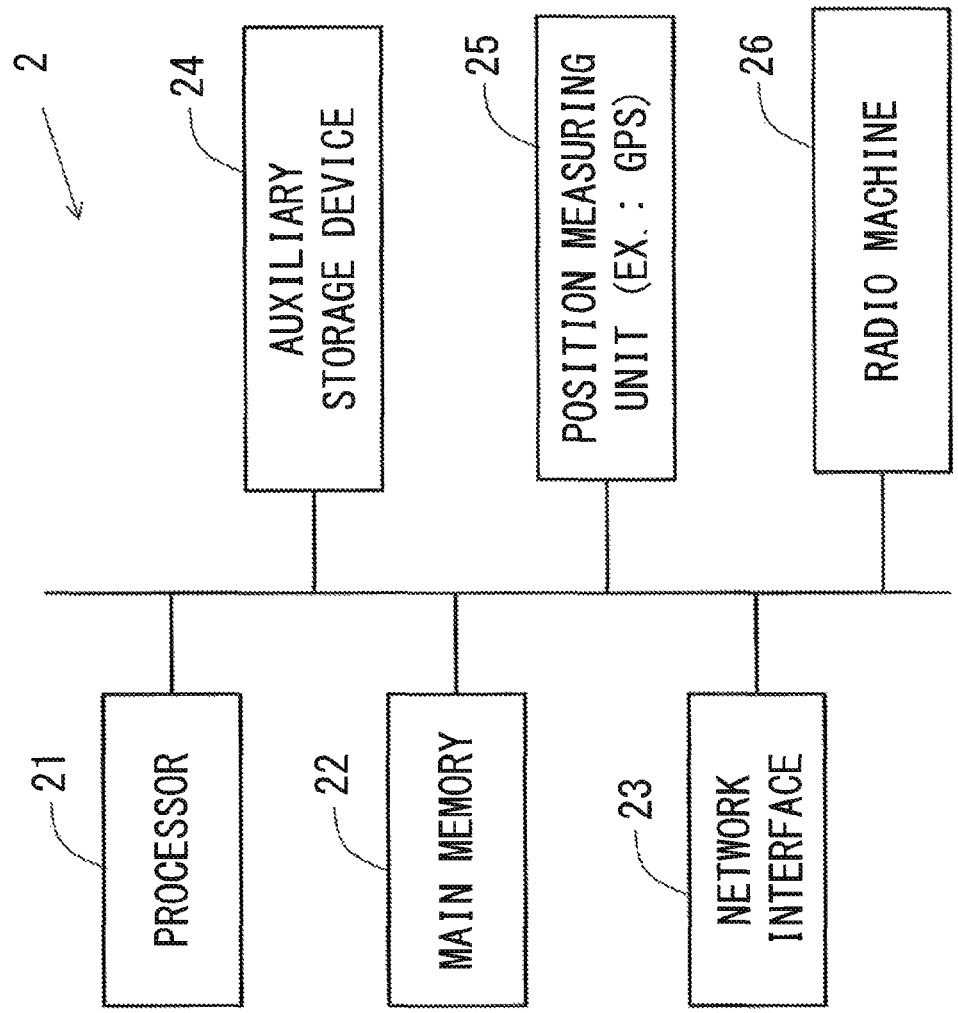
FIG. 6 is a diagram illustrating a device configuration of the master device.

FIG. 6 illustrates a device configuration of the master device 2. The master device 2 includes a processor 21, a main storage device 22, a network interface 23, an auxiliary storage device 24, a position measuring unit 25 and radio machine 26. The processor 21 executes a computer program deployed in an executable manner on the main storage device 22, thereby providing functions of the master device 2. The main storage device 22 stores the computer program to be executed by the processor 21 and data etc. to be processed by the processor 21. The main storage device 22 is exemplified such as a Dynamic Random Access Memory (DRAM), a Static Random Access Memory (SRAM) and a Read Only Memory (ROM).

The network interface 23 is exemplified such as a NIC (Network Interface Card). The master device 2 accesses, e.g., the public communication network via the network interface 23, and performs the communications with the WS database server 1. However, the master device 2 may access a dedicated line via the network interface 23.

The auxiliary storage device 24 is used as, e.g., a storage area to assist the main storage device 22, and stores the computer program to be executed by the processor 21 and the data etc. to be processed by the processor 21. The auxiliary storage device 24 is exemplified such as a hard disk drive and a Solid State Disk (SSD).

The position measuring unit 25 is, e.g., a GPS (Global Positioning System). The position measuring unit 25 calculates a present position, e.g., a latitude and a longitude of the master device 2.

The radio machine 26 includes a MODEM (modulator and demodulator), an amplifier, an antenna, etc. for wireless communications. The master device 2 performs the communications with the slave device 3 by use of the WS frequency via the radio machine 26 within the communication area. Note that the master device 2 may further include a communication unit to perform the communications via, e.g., the cellular network in addition to the radio machine 26 to execute the wireless communications on the assumption of using the WS frequency.

Figure 7:
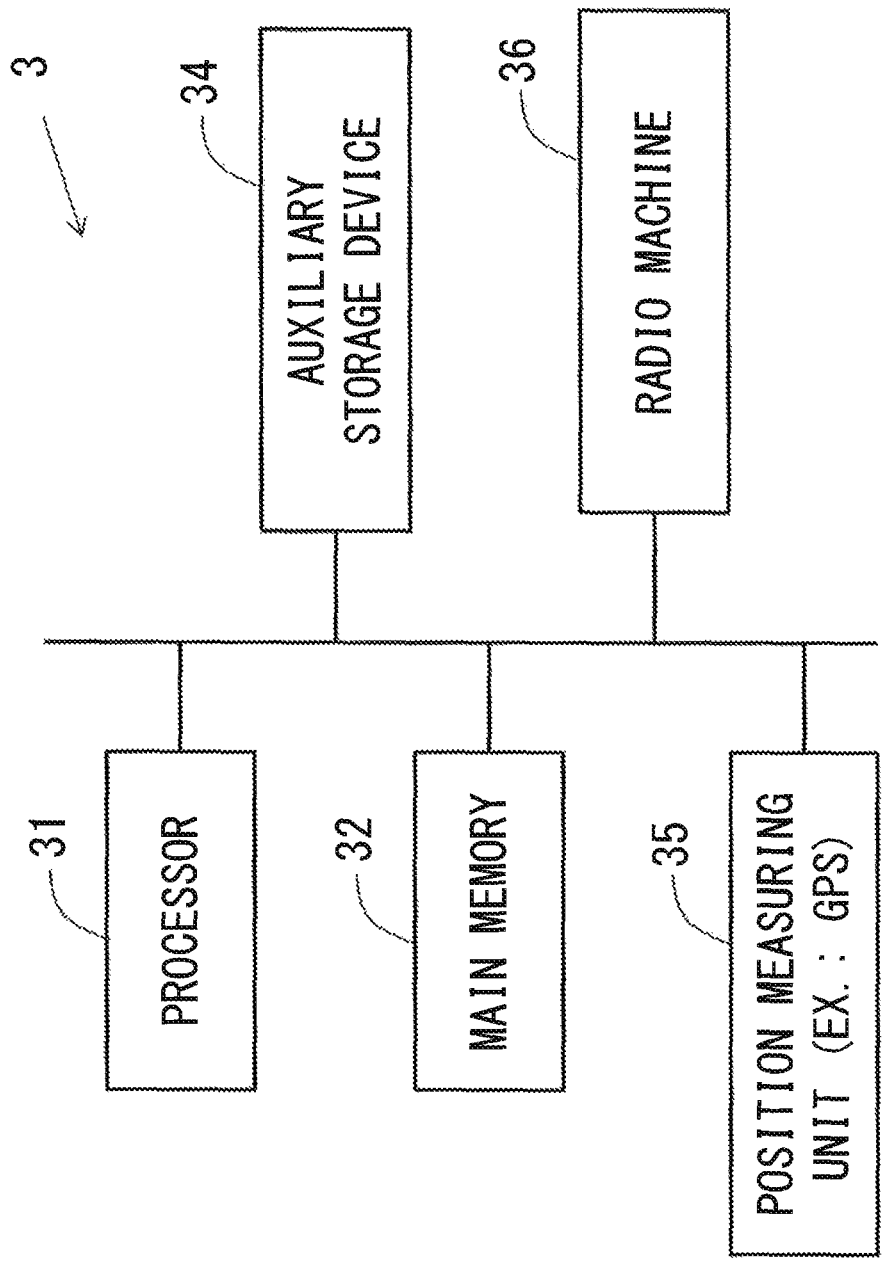
FIG. 7 is a diagram illustrating a device configuration of the slave device.

FIG. 7 illustrates a device configuration of the slave device 3. The slave device 3 includes a processor 31, a main storage device 32, an auxiliary storage device 34, a position measuring unit 35 and a radio machine 36. Functions and operations of the processor 31, the main storage device 32, the auxiliary storage device 34, the position measuring unit 35 and the radio machine 36 are the same as those of the master device 2 in FIG. 6. Note that the slave device 3 may have the same configuration as the network interface 23 of the master device 2 has. Moreover, the slave device 3 may have the communication unit to perform the communications via a second network (such as the cellular network, WiFi and WiMAX) other than the radio machine 36.

Figure 8:
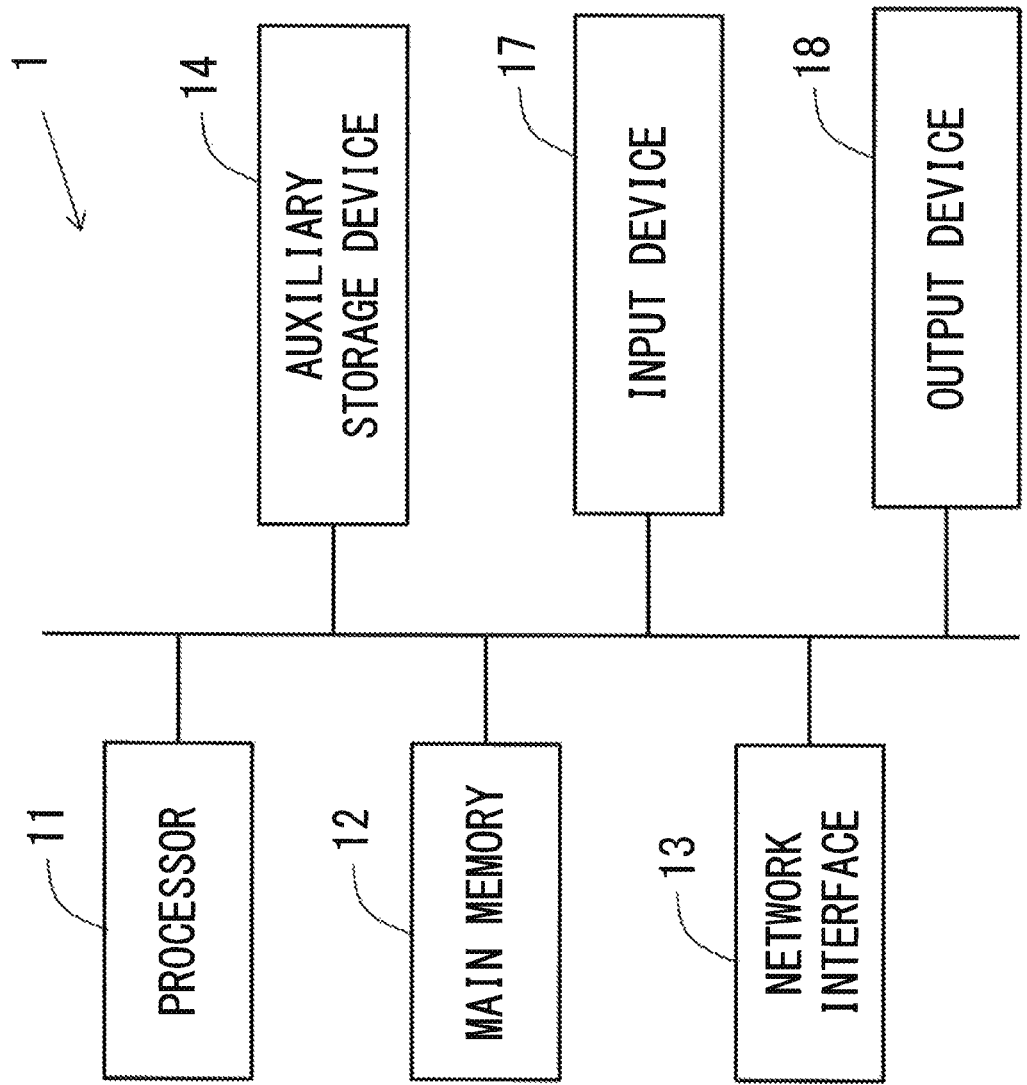
FIG. 8 is a diagram illustrating a device configuration of the WS database server.

FIG. 8 illustrates a device configuration of the WS database server 1. The WS database server 1 includes a processor 11, a main storage device 12, a network interface 13 and an auxiliary storage device 14. Functions and operations of the processor 11, the main storage device 12, the network interface 13 and the auxiliary storage device 14 are the same as those of the master device 2 in FIG. 6. Further, the WS database server 1 may have the communication unit to perform the communications via the cellular network other than the network interface 13. The WS database server 1 may have the same configuration as the configuration of the radio machine 26 of the master device 2.

Moreover, the WS database server 1 has an input device 17 and an output device 18. The input device 17 is exemplified such as a keyboard and a pointing device. The output device 18 is exemplified such as a liquid crystal display and an electroluminescence panel.

Furthermore, each of the master device 2, the slave device 3 and the WS database server 1 may be provided with a detachable storage medium drive. A detachable non-transitory storage medium is exemplified by, e.g., a Blu-ray disc, a Digital Versatile Disk (DVD), a Compact Disc (CD), a flash memory card, etc.

<Functional Configuration>

<<Master Device>>

Figure 9:
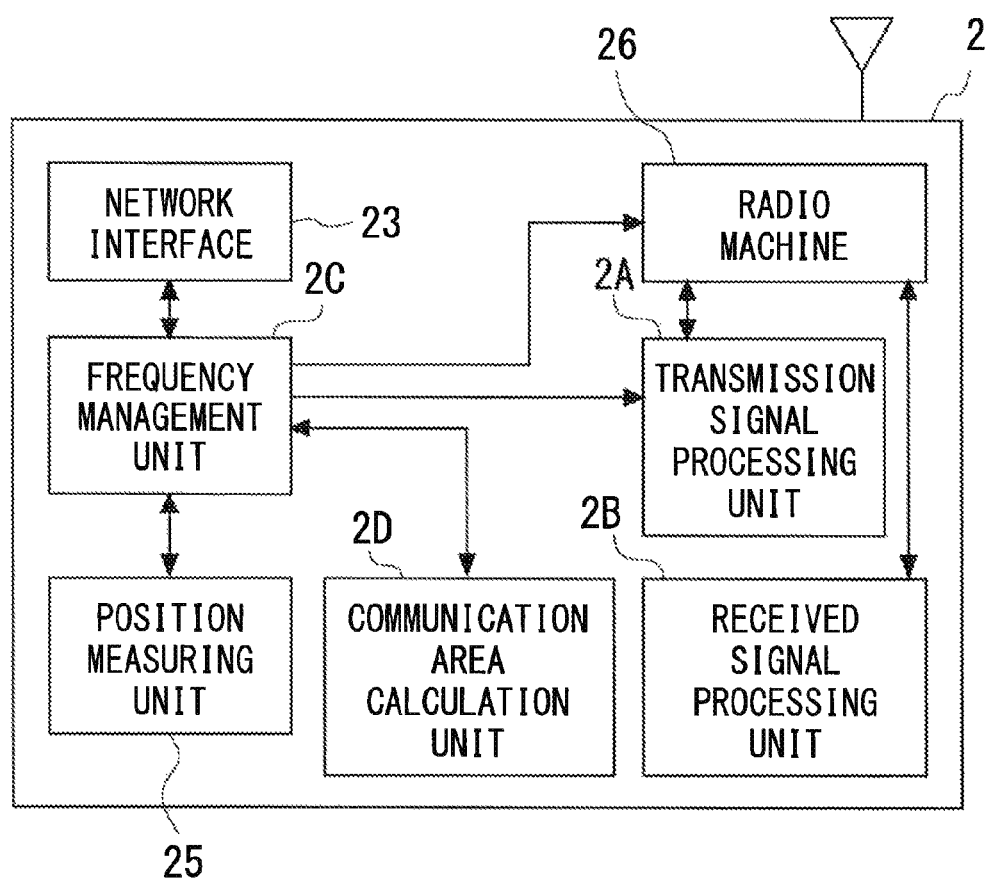
FIG. 9 is a diagram illustrating a functional configuration related to communications using a WS frequency of the master device.

FIG. 9 illustrates a functional configuration related to the communications using the WS frequencies of the master device 2. In FIG. 9, the master device 2 further includes, in addition to the network interface 23, the position measuring unit 25 and the radio machine 26, a transmission signal processing unit 2A, a received signal processing unit 2B, a frequency management unit 2C and a communication area calculation unit 2D. Note that the processor 21 of the master device 2 executes, e.g., a program deployed in the executable manner on the main storage device or firmware etc. on the ROM by way of the transmission signal processing unit 2A, the received signal processing unit 2B, the frequency management unit 2C and the communication area calculation unit 2D.

The transmission signal processing unit 2A acquires, for generating the radio signal to be transmitted from the radio machine 26, data from, e.g., a high-order layer, OS, etc. of the processor 21, then generates a baseband signal, and further executes digital modulation e.g., of the baseband signal. On the other hand, the received signal processing unit 2B acquires the digital modulated signal from the radio machine 26, extracts the baseband signal, then acquires the digital data transmitted from a transmission source, and hands over the acquired digital data to, e.g., the high-order layer, the OS, etc. of the processor 21.

The frequency management unit 2C manages the frequencies to be used and the communication areas by employing the main storage device 22. When executing the sequence as in FIG. 4, the frequency management unit 2C inputs existing position information measured by the position measuring unit 25, the device information and a usable minimum frequency to the communication area calculation unit 2D. In the calculation by the communication area calculation unit 2D, the communication area becomes broader in its range to be obtained as the frequency becomes lower. Such being the case, in a state where the frequency to be used is not yet determined, the frequency management unit 2C inputs the minimum frequency being the lowest in the usable frequencies to the communication area calculation unit 2D. It does not, however, mean that the process in the sequence as in FIG. 4 is limited to the minimum frequency.

The frequency management unit 2C transmits, via the network interface, the device information together with the communication area calculated by the communication area calculation unit 2D to the WS database server 1, and obtains the WS frequency list and the usable range information. The frequency management unit 2C stores the obtained WS frequency list and usable range information in the main storage device 2 (22 に補正致します。). The frequency management unit 2C and the main storage device 22 are one example of a storage unit. Further, the frequency management unit 2C is also one example of a list acquiring unit. Still further, the frequency management unit 2C is also one example of a restriction acquiring unit. The WS frequency list is one example of a list of usable frequencies. Moreover, the WS frequency is one example of a usable frequency.

In the first embodiment, the usable range information becomes information equal to the access restriction flag that is transmitted to the slave device 3 from the master device 2. Namely, the access restriction flag is OFF when the frequency is usable in the communication area throughout but is ON when usable only in the segment of the communication area. The WS frequency with the access restriction flag being ON is one example of a restriction frequency.

Moreover, the frequency management unit 2C selects the WS frequency and transmits the selected WS frequency together with the access restriction flag to the transmission signal processing unit 2A. The access restriction flag is generated as a report signal and is transmitted to within the communication area from the radio machine 26. A reference frequency for selecting the WS frequency in the frequency management unit 2C is exemplified by a frequency having a broad usable range or a frequency causing a small quantity of interference. When the frequency causing the small quantity of interference is set as the reference frequency, the master device 2 may have an interference measuring unit. The interference measuring unit executes measuring the interference of each WS frequency. The frequency management unit 2C is also one example of a notifying unit. Moreover, the access restriction flag is one example of a signal to request checking whether the restricted frequency can be used or not.

The communication area calculation unit 2D retains information about a propagation environment corresponding to the position, and calculates the communication area in accordance with input information. A method by which the communication area calculation unit 2D obtains the communication area will be demonstrated as below.

<<Method of Obtaining Communication Area>>

To start with, as given in the following formula, maximum allowable propagation attenuation PL is obtained from transmission power P, a transmission antenna gain G_tx, a reception antenna gain G_rx, device attenuation Lm such as a feeder loss, and reception power usage of a sender, e.g., the master device 2.

$$PL = P + G\_tx + G\_rx - Lm - C;$$

Next, a propagation distance d, which defines the communication area, is obtained from the maximum allowable propagation attenuation PL, a transmission antenna height h_tx, a reception antenna height h_rx and a using frequency f. For example, the calculation can be done by using the following Okumura-Hata Model.

$$PL = 69.55 + 26.16 \log_{10} f - 13.82 \log_{10} h\_tx - a(h\_rx) + (44.9 - 6.55 \log_{10} h\_tx) \log_{10} d$$

Herein, a value of a(h_rx) differs depending on the propagation environment such as an urban area, a suburb and an open area, and is given as follows in the case of the urban area:

$$a(h\_rx) = 3.2(\log_{10}(11.75a(h\_rx)))^2 - 4.97;$$

The communication area is defined by a circle of which a center is the position of the master device 2 and of which a radius is given by the distance d obtained above. Alternatively, when the propagation environment varies on a direction-by-direction basis, the master device 2 can calculate the distance on the direction-by-direction basis and can also set the calculated distance for the range of the communication area.

Note that the communication area can be also obtained from an actual measurement. In terms of restrictions in time and cost, however, it is desirable that the communication area is obtained by the calculation based on a propagation path model. The communication area of the master device 2 may be calculated by the master device 2 itself and may also be calculated by the WS database server 1 according to the master device information.

<<Slave Device>>

Figure 10:
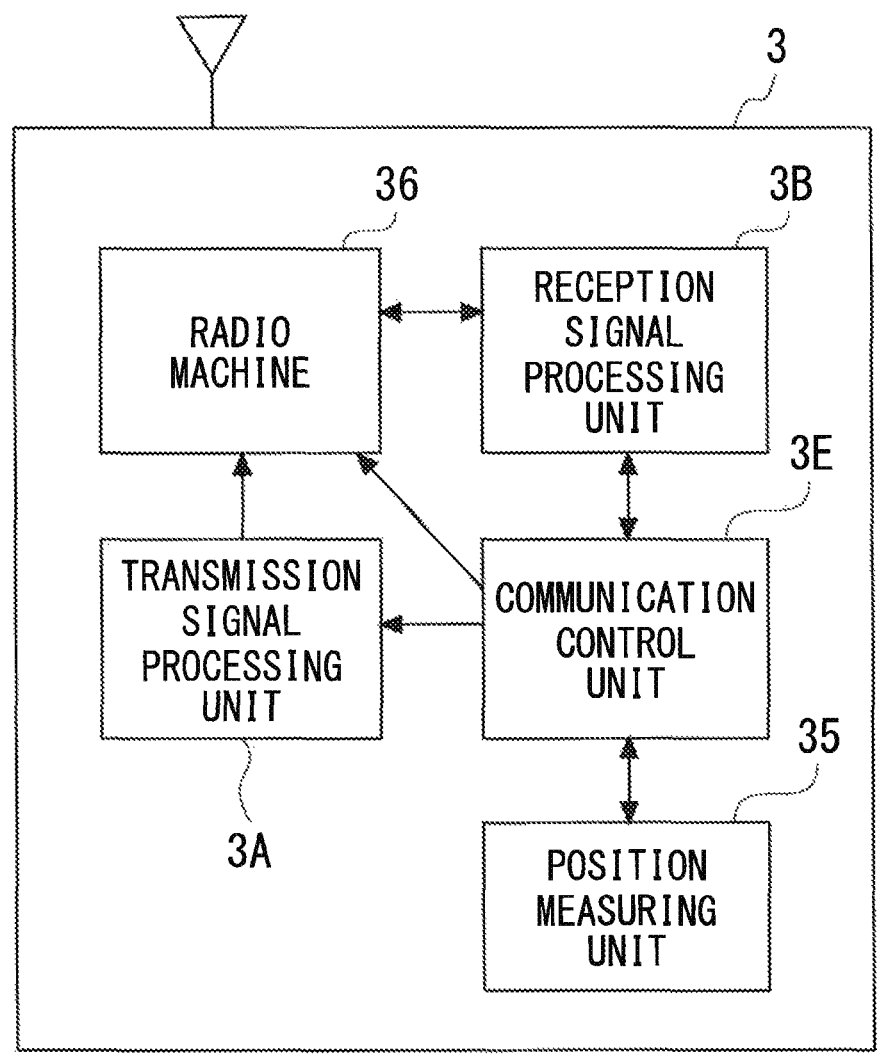
FIG. 10 is a diagram illustrating a functional configuration related to the WS frequency and a communication area of the slave device.

FIG. 10 illustrates a functional configuration in relation to the WS frequency and the communication area of the slave device 3. In FIG. 10, the slave device 3 further includes, in addition to the position measuring unit 35 and the radio machine 36, a transmission signal processing unit 3A, a received signal processing unit 3B and a communication control unit 3E. However, such a case may exist that the slave device 3 does not include the position measuring unit 35. Further, the transmission signal processing unit 3A and the received signal processing unit 3B are the same as those of the master device 2 in FIG. 9. Furthermore, similarly to the description of the master device 2 in FIG. 9, the processor 31 of the slave device 3 executes, e.g., a program deployed in the executable manner on the main storage device or firmware etc. on the ROM by way of the transmission signal processing unit 3A, the received signal processing unit 3B and the communication control unit 3E.

The communication control unit 3E notifies the radio machine 36 of the candidate frequencies stored in the main storage device 32. The radio machine 36 determines the frequency of the received radio signal by sequentially scanning the candidate frequencies, and converts the received radio signal into the baseband signal. A converted result is handed over to the received signal processing unit 3B. Then, the received signal processing unit 3B detects, based on a scanned result of the candidate frequencies scanned by the radio machine 36, the frequency with the signal coming from the master device 2, and extracts the report signal.

The communication control unit 3E determines from the access restriction flag in the report signal whether the frequency requests a query based on the detected existing position information or not. When the query is not requested, the communication control unit 3E instructs the transmission signal processing unit 3A to generate a connection request signal. The generated connection request signal is transmitted to the master device 2. When the frequency requests the query, the communication control unit 3E instructs the received signal processing unit 3B to scan other candidate frequencies, thus detecting the frequency which does not request the query. Then, the communication control unit 3E requests the master device 2 to establish a connection through the frequency which does not request the query. The communication control unit 3E is one example of a frequency acquiring unit. Further, the communication control unit 3E is also one example of a selecting unit.

Moreover, the slave device 3 may query about the usable range of the frequency which requests the query via, e.g., a second network (such as the cellular network, WiFi and WiMAX). For example, it may be sufficient that the communication control unit 3E transmits the query signal containing the existing position information acquired by the position measuring unit 35 to the WS database server 1 via the second network. The communication control unit 3E is one example of a checking unit.

When a content of the query is a query about whether a specific WS frequency is usable or not, it may be sufficient that the WS database server 1 gives an affirmative or negative response. Alternatively, the slave device 3 may query about the usable frequency in the existing position of the slave device 3. When the slave device 3 queries about the usable frequency in the existing position, it may be sufficient that the WS database server 1 gives, as a response, the list of usable frequencies in the existing position of the slave device 3.

Then, it may be sufficient that the communication control unit 3E of the slave device 3 determines whether or not the frequency desired to be used for the communications with the master device 2 is contained in the list of usable frequencies being given as the response. Namely, it may be sufficient that the communication control unit 3E determines, when the frequency desired to be used is contained in the list of usable frequencies, that the frequency is usable, and transmits the connection request signal to the mater device 2 by employing the frequency desired to be used. The communication control unit 3E, the transmission signal processing unit 3A and the radio machine 36 are one example of a communication unit.

<<Database Server>>

Figure 11:
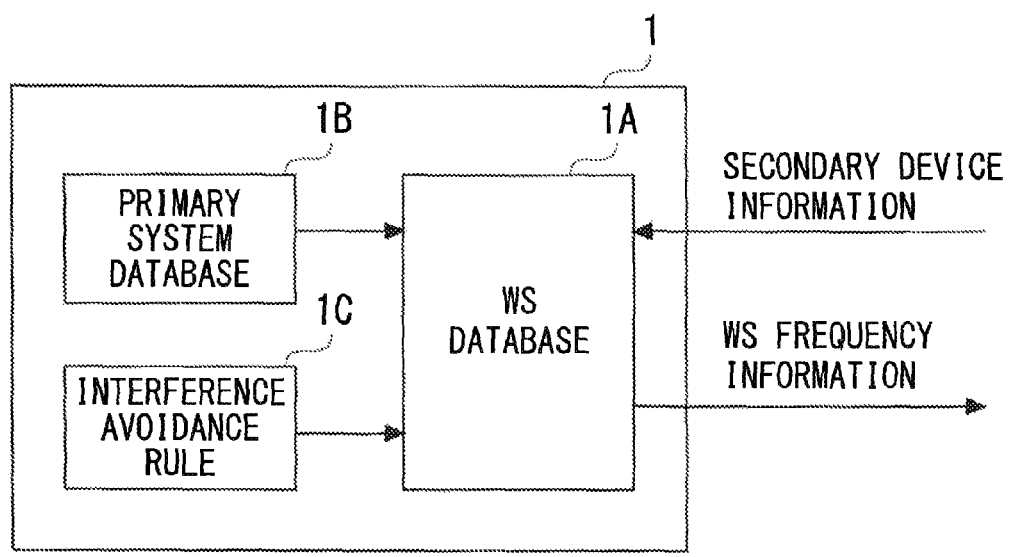
FIG. 11 is a diagram illustrating a configuration of the WS database server.

FIG. 11 illustrates a diagram of a configuration of the WS database server 1. The WS database server 1 includes a WS database 1A, a primary system database 1B and an interference avoidance rule 1C.

The WS database 1A is used for determining the usable WS frequencies. On the other hand, the primary system database 1B stores information of the primary system. The primary system database 1B stores, e.g., positional information of a primary system protection area per frequency as the information of the primary system.

The interference avoidance rule 1C has a storage means that stores a counter primary system interference avoidance rule. The counter primary system interference avoidance rule is determined generally by a radio wave supervision institution or a standardization institution. The counter primary system interference avoidance rule is exemplified by a reference level, in which to set, as a reference, a signal level that is to be attenuated till the signal coming from the secondary system reaches the primary system protection area. There are determined the transmission power, the antenna heights, etc. of the devices, i.e., the master device 2 and the slave device 3 used in the secondary system fulfilling the reference level by the distances up to the primary system protection area from the respective positions of the secondary system. The devices such as the master device 2 and the slave device 3 used in the secondary system, will hereinafter be simply referred to as the secondary devices.

The WS database server 1 builds up the WS database 1A by calculating the WS frequencies corresponding to the locations and the time on the basis of the information of the primary system and the counter primary system interference avoidance rule.

FIG. 12 illustrates the WS database 1A. The WS database 1A stores the antenna heights and the transmission power of the secondary devices, the heights and the power being usable per position and per frequency. In FIG. 12, for instance, the antenna height and the maximum allowable transmission power are set per (xM, yM) defined as the latitude and the longitude and per frequency f1-fk.

When receiving, from the secondary device, a query about the usable frequencies in the existing position of the secondary device, the WS database server 1 extracts the usable frequencies from the items of device information such as the positional information, the transmission power information and the antenna height information of the secondary device, and transmits the extracted frequencies back to the secondary device. Further, when receiving a query about whether a certain frequency is usable in a certain area or not, the WS database server 1 checks all points covered by this area, and transmits a check result indicating the frequency being usable or unusable in the whole area back to the secondary device. Herein, the "all the points" connote, e.g., sample points that are properly set. All the points may also be set based on meshes at predetermined intervals.

In the case of the query about the usable frequencies in a certain area, the WS database server 1 extracts the frequencies usable in all the respective points covered by that area. Then, the WS database server 1 transmits a list of extracted frequencies and information indicating whether the respective frequencies are usable or unusable in the whole area back to the secondary device. When the query from the secondary device contains a condition such as "the frequency being usable in x % or larger of the whole area", it may be sufficient that the WS database server 1 selects and transmits back the frequencies satisfying the condition. The processor 1 of the WS database server 1 executes the computer program, the firmware, etc. deployed in the executable manner on the main storage device 2 by way of one example of a reception unit, an extraction unit and a transmission unit.

<Flowchart of Process>

Figure 13:
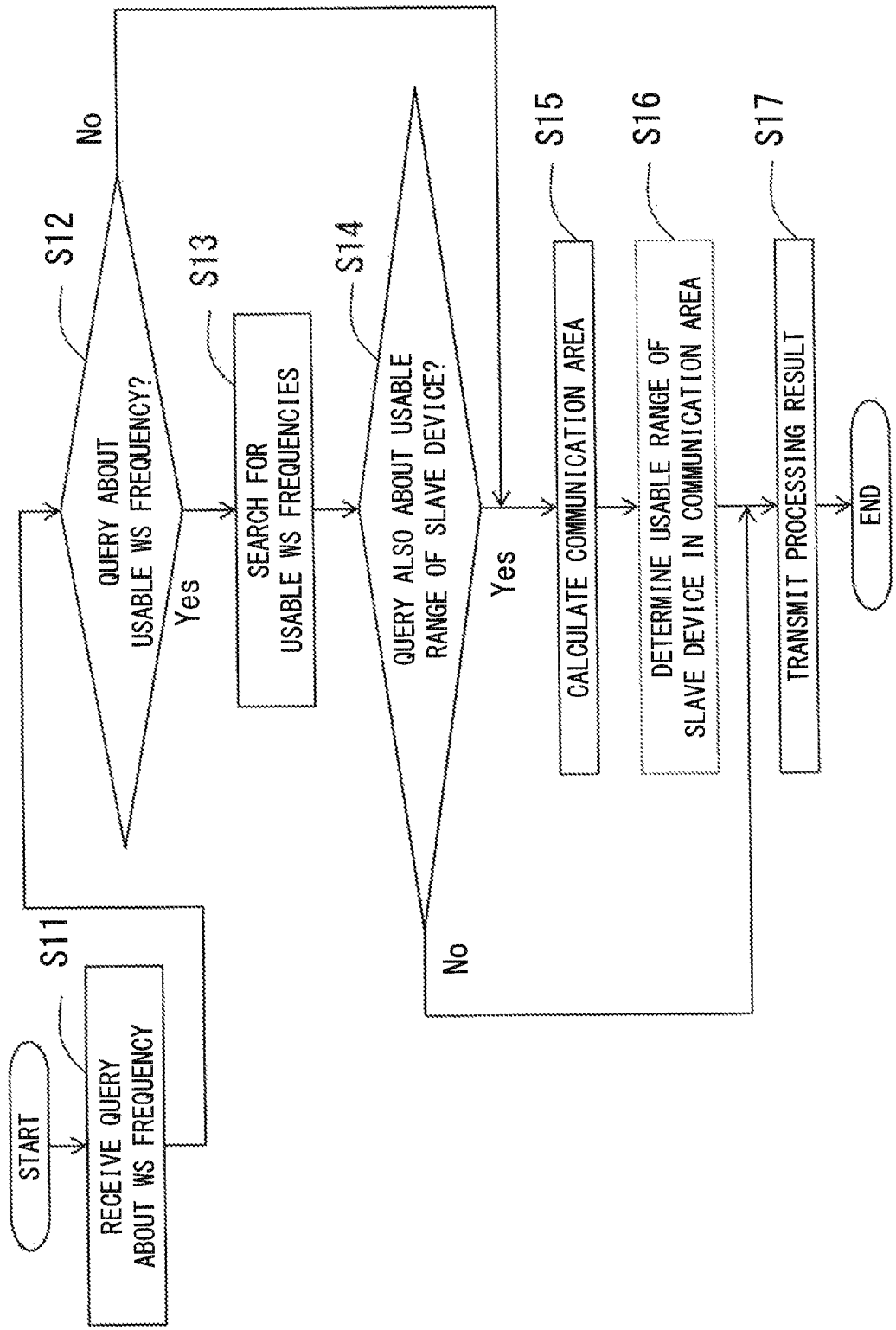
FIG. 13 is a diagram illustrating a flowchart of processes executed by the WS database server.

FIG. 13 illustrates a flowchart of processes executed by the WS database server 1. The WS database server 1 responds to the query about the WS frequency, and transmits the list of WS frequencies and the usable range back to an inquirer. A start of the processes in FIG. 13 is triggered by the WS database server 1 receiving the query about the WS frequency (S11). The processor 11 of the WS database server 1 executes a process in S11 in a way that functions as the reception unit. Then, the WS database server 1 determines whether the query is a query about the usable WS frequencies or not (S12).

When the query about the WS frequencies is the query about the usable WS frequencies, the WS database server 1 searches the WS database 1A for the usable WS frequencies (S13). More specifically, the WS database server 1 extracts the usable WS frequencies from the WS database 1A on the basis of the device information such as the position, the allowable transmission power and the antenna height information of the secondary device, which are added to the query about the usable WS frequencies. The processor 11 of the WS database server 1 executes a process in S13 in a way that functions as the extraction unit.

Next, the WS database server 1 determines whether there is also a query about the usable range of the slave device 3 or not (S14). When there is also the query about the usable range of the slave device 3, the WS database server 1 calculates the communication area (S15). The calculation of the communication area may, however, be made by the secondary device defined as the inquirer. When the secondary device as the inquirer calculates the communication area, the communication area information is handed over to the WS database server 1 from the secondary device.

Then, the WS database server 1 determines whether or not the slave device 3 can use the usable WS frequencies being already searched for in S13 at the respective points of the communication area (S16). The determination in S16 is made based on the slave device information such as the allowable transmission power etc. of the slave device 3. The processor 11 of the WS database server 1 executes the process in S16 in a way that functions as a restriction checking unit.

Then, the WS database server 1 sends, as a response, a processing result back to the inquirer (S17). This response includes sending back the list of WS frequencies usable by the master device 2. Note that the list contains, together with the WS frequencies, information indicating whether the slave device 3 can use the WS frequencies included in the list at all the points of the communication area or in the segment of the communication area. The processor 11 of the WS database server 1 executes the process in S17 in a way that functions as the transmission unit.

Note that when the query in S11 is not the query about the usable WS frequencies (NO in S12), it follows that the query pertains to the usable range of the slave device 3. In this case, the query contains the usable frequencies designated by the secondary device and the slave device information. In response to this query, the WS database server 1 determines whether the usable frequencies are usable at all the points of the communication area or not. Further, this query may contain the existing position of the slave device 3. When the query contains the existing position of the slave device 3, it is determined whether or not the slave device 3 can use the usable frequencies not at the respective points of the communication area but in the existing position concerned.

Figure 14:
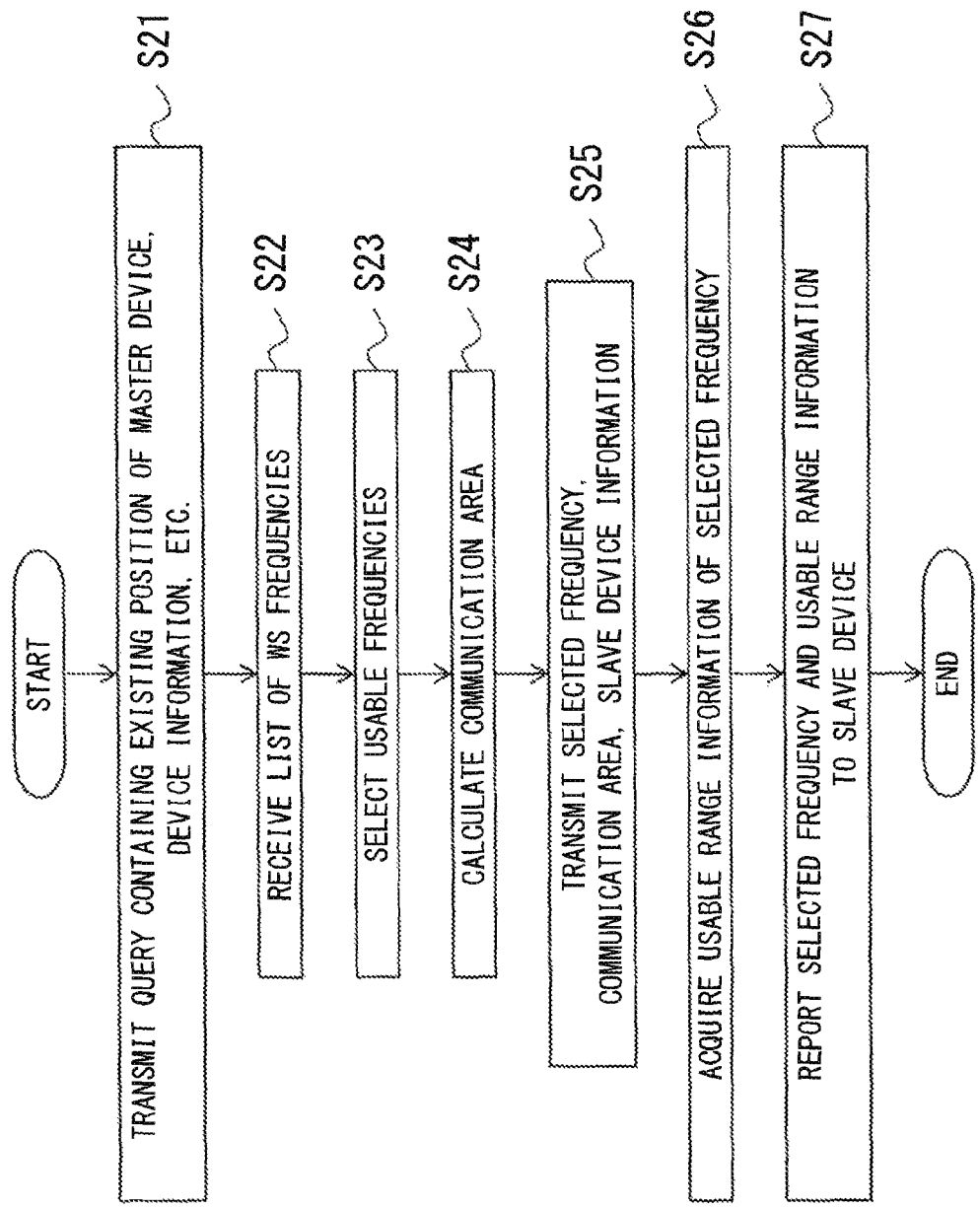
FIG. 14 is a diagram illustrating a flowchart of processes executed by the master device.

FIG. 14 illustrates a flowchart of processes executed by the master device 2. In the processes of FIG. 14, the master device 2 acquires the list of WS frequencies usable in the communication area and information on the usable range of the WS frequencies contained in the list. To begin with, the master device 2 transmits the query containing the existing position of the master device 2 and the master device information to the WS database server 1 (S21).

Next, the master device 2 receives the list of WS frequencies from the WS database server 1 (S22). The master device 2 stores the received list of WS frequencies in the main storage device 22. The processor 21 of the master device 2 executes the process in S22 in a way that functions as a storage unit and the list acquiring unit.

Then, the master device 2 selects the frequency to be used from the list of WS frequencies (S23). Furthermore, the master device 2 calculates the communication area (S24). The communication area may, however, be calculated based on the master device information not by the master device 2 but by the WS database server 1. When the WS database server 1 calculates the communication area, the master device 2 may omit the process in S24.

Next, the master device 2 transmits the selected frequencies, the communication area and the slave device information to the WS database server 1 (S25). Then, the master device 2 acquires the information on the usable range of the frequencies selected in S23 from the WS database server 1 (S26). The processor 21 of the master device 2 executes the processes in S25 and S26 in a way that functions as the restriction acquiring unit.

Then, the master device 2 reports, to the slave device 3, the frequencies selected in S23 and the usable range information acquired in S26 (S27). To be more specific, the master device 2 sets OFF the access restriction flag with respect to the frequencies usable by the slave device 3 at all the points of the communication area, and reports this setting-OFF to the slave device 3. While on the other hand, the master device 2 sets ON the access restriction flag with respect to the frequencies unusable by the slave device 3 at points of at least the segment of the communication area, and reports this setting-ON to the slave device 3.

Note that in the processes of FIG. 14, the master device 2 queries about the list of WS frequencies (query in S21) and queries about information on the usable range of the frequencies selected in S23. In place of the processes in FIG. 14, however, the master device 2 may query about information on the usable range for the slave device 3 together with the list of WS frequencies by adding the slave device information to the query about the list of WS frequencies. This process corresponds to, e.g., the process illustrated in FIG. 4.

Figure 15:
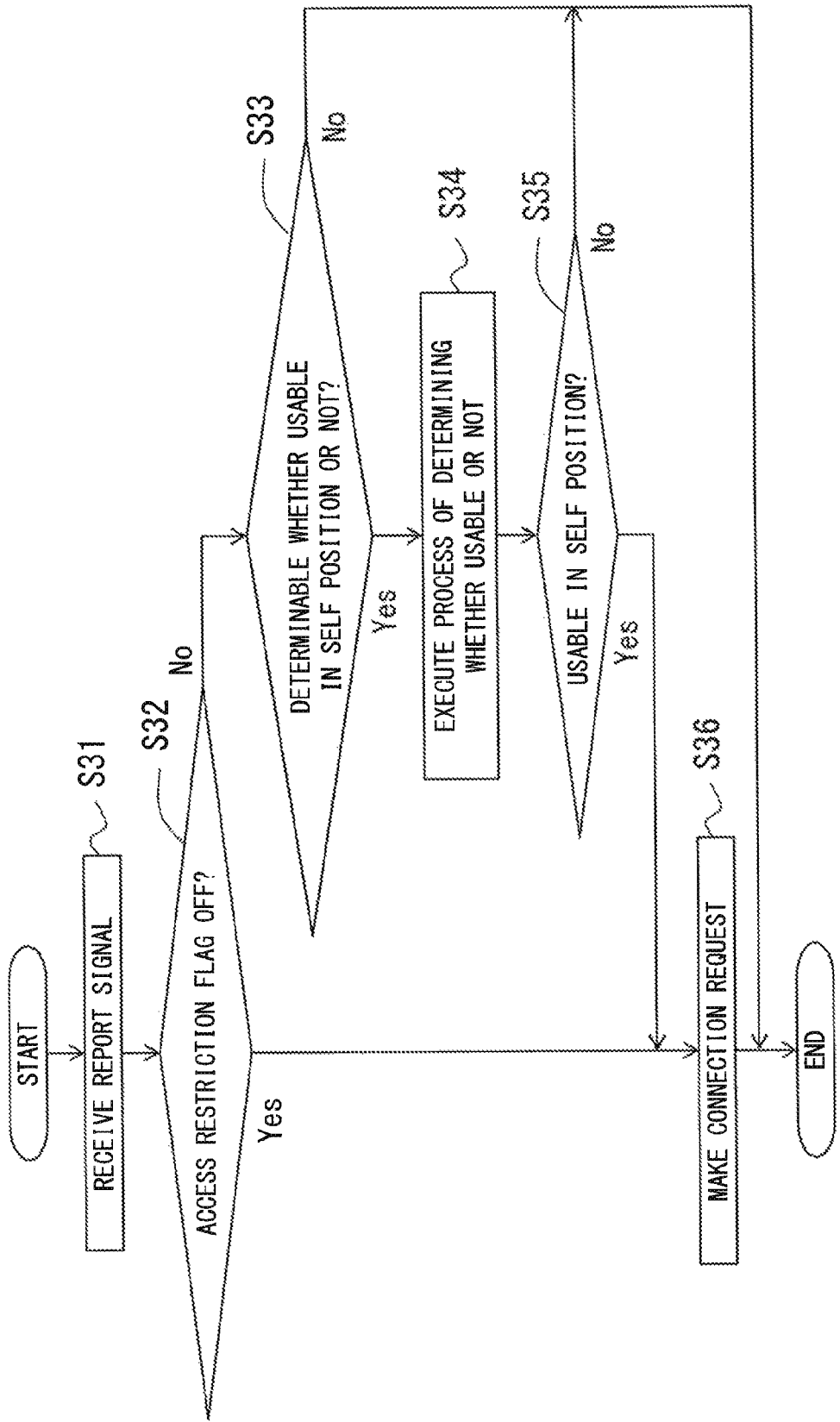
FIG. 15 is a diagram illustrating a flowchart of processes executed by the slave device.

FIG. 15 illustrates a flowchart of processes executed by the slave device 3. In the processes of FIG. 15, the slave device 3 determines, based on the report signal given from the master device 2, a necessity or non-necessity for checking whether the WS frequency is usable or not. In the processes of FIG. 15, the slave device 3 receives the report signal from the master device 2 (S31). As already described, the slave device 3 sequentially scans the candidate frequencies, and thus determines whether the report signal exists or not. The report signal contains the access restriction flag. The processor 31 of the slave device 3 executes the process in S31 in a way that functions as the frequency acquiring unit.

Next, the slave device 3 determines whether the access restriction flag is OFF or not (S32). When the access restriction flag of the selected frequency is OFF, the slave device 3 advances the processing to step S36. Then, the slave device 3 transmits the request for the connection with the master device 2 (S36). The processor 31 of the slave device 3 executes the process in S31 in a way that functions as the selecting unit.

When the access restriction flag is ON (NO in S32), the slave device 3 determines a determinability or non-determinability as to whether the WS frequency is usable or unusable in the self existing position (S33). Moreover, the "determinability" implies such a case that, for example, the slave device 3 has the position measuring unit 35 such as a GPS (Global Positioning System). Further, the "determinability" implies a case of existence of a path via which the slave device 3 accesses the WS database server 1. More concretely, the "determinability" implies such a case that, for instance, the slave device 3 can access the WS database server 1 via the second network like the cellular network etc.

When determinable, the slave device 3 executes a determination process to determine whether the WS frequency is usable in the self position. For example, it may be sufficient that the slave device 3 queries the WS database server 1 about whether the WS frequency is usable in the self position or not by specifying the WS frequency, the communication area, the slave device information, etc. (S34). Then, the slave device 3 transmits, based on a determination result, the request for the connection with the master device 2 (S36) when the WS frequency is usable in the self exiting position (YES in S35).

The processor 31 of the slave device 3 executes the processes in S34 and S35 in a way that functions as the checking unit. Further, the processor 31 of the slave device 3 executes the process in S36 in the way of functioning as the communication unit.

Whereas when not determinable in S33 or when the WS frequency is not usable in S35, the slave device 3 terminates the processing without transmitting the connection request.

As discussed above, according to the communication system in Example 1, the master device 2 acquires the list of WS frequencies usable in the communication area from the WS database server 1. Moreover, the master device 2 acquires, from the WS database server 1, the usable range information indicating whether or not the frequencies contained in the list of WS frequencies are the frequencies usable by the slave device 3 at all the points of the communication area. Then, the master device 2 sets OFF the access restriction flag with respect to each of the frequencies, usable by the slave device 3 at all the points of the communication area, in the frequencies contained in the list of WS frequencies, and reports these usable frequencies to the slave device 3. By contrast, the master device 2 sets ON the access restriction flag with respect to each of the frequencies, unusable at points of at least the segment of the communication area, in the frequencies contained in the list of WS frequencies, and reports these unusable frequencies to the slave device 3.

Then, the slave device 3, when accessing the master device 2 by use of the WS frequency with the access restriction flag being OFF, transmits the radio signal without performing the previous check. Accordingly, the slave device 3 can use the informed WS frequency as it is.

On the other hand, the slave device 3, when accessing the master device 2 by use of the WS frequency with the access restriction flag being ON, previously checks whether or not the WS frequency is usable at the existing point of the slave device 3. Then, when the WS frequency is usable at the existing point of the slave device 3, the slave device 3 accesses the master device 2 by transmitting the radio signal of the WS frequency thereto. Hence, the master device 2 and the slave device 3 can use the frequencies unusable by the slave device 3 at the points of at least the segment of the communication area without affecting the primary system. Namely, it is feasible to expand the range of the frequencies utilizable as the WS frequencies in the same communication area to a greater degree than before. Alternatively, it is possible to expand the range of the communication area in which the master device 2 can use the frequencies of the list of WS frequencies acquired from the WS database server 1.

Modified Example

Note that Example 1 may adopt a communication system configured such that the master device 2 and the slave device 3 perform Time Division Duplex by use of the single WS frequency. Further, such a communication system may also be adopted that the master device 2 and the slave device 3 perform Frequency Division Duplex by use of the plurality of WS frequencies.

Moreover, in Example 1, the master device 2 may calculate the communication area. Furthermore, the master device 2 may transmit the master device information such as the allowable transmission power and the antenna height to the WS database server 1, while the WS database server 1 may calculate the communication area of the master device 2.

Further, in the process of S34, the slave device 3 queries the WS database server 1 about whether the WS frequency is usable in the self position or not by specifying the WS frequency, the communication area, the slave device information, etc. As a substitute for this process, the slave device 3 may measure an intensity of the radio wave etc. and may carry out the determination process on the occasion of using the frequency with the access restriction flag being ON. For example, it may be sufficient that the slave device 3 measures the intensity of the radio wave coming from the primary system at the relevant WS frequency, then determines that the WS frequency is usable for the transmission in the present position when the intensity is equal to or lower than the reference level, and transmits at the relevant WS frequency. Accordingly, it may be sufficient that each slave device 3 is equipped with a spectrum sensing unit for measuring the intensity of the radio wave.

The reference of the intensity is determined generally by the radio wave supervision institution or the standardization institution, and hence it may be sufficient that the slave device 3 follows regulations. In the case of the communication system in which the slave device 3 does not retain any regular intensity, the master device 2 may inform the slave device 3 of the regular intensity.

Further, in Example 1, as illustrated in FIG. 15, when the slave device 3 uses the WS frequency with the access restriction flag being ON, it is checked whether the WS frequency is usable in the existing position of the slave device 3 or not. For example, when the master device 2 can grasp the existing position of the slave device 3, however, such an available setting is also feasible that the slave device 3 does not check whether the WS frequency is usable or not. For instance, the master device 2 may directly inform of an ID (identification) of the slave device 3 with the access restriction being unnecessary (or necessary) per frequency. Particularly in the case of a fixed slave device, if the positional information and the device information are registered in the master device 2 when installed, it follows that the master device 2 grasps the existing position of the slave device 3.

When the self device is not contained in the IDs with designation of the access restriction being unnecessary, it may be sufficient that each slave device 3 confirms that the relevant frequency is usable by making a query through the self positional information and then uses the frequency, or alternatively selects not to use the relevant frequency.

Moreover, the access restriction flag may be defined together with the transmission power, a transmission bandwidth, the antenna height, etc. For example, the master device 2 may inform of the following items with respect to a certain frequency. To be specific, the master device 2 can specify the operation of the slave device 3 in accordance with the following indications.

(1) The check about whether usable or unusable is not requested for the transmission through the transmission power that is less than a reference value (e.g., 100 mW) based on the slave device 3.

(2) The check about whether usable or unusable is requested for the transmission through the transmission power that is equal to or larger than the reference value based on the slave device 3.

Further, the master device 2 may transmit report information indicating that it is requested, though unnecessary for checking whether usable or unusable in a certain segmental area existing in the communication area, to check whether usable or unusable in other segmental areas. Namely, the master device 2 may transmit not the access restriction information about the whole communication area but the access restriction information about each of sub-segmented areas into which the communication area is sub-segmented.

The communication area takes an irregular shape due to influences of landform and buildings in many cases. The master device 2 defines, as the areas with the access restriction being unnecessary, a maximum circular area, a square area or a polygonal area each covered by the area with a certain frequency being usable in the communication area, and may inform of these defined areas. The master device 2 can restrain a data size of the report information owing to the report based on these definitions. For example, in the case of the circular area formed with the master device 2 being centered, it may be sufficient that the master device 2 reports only a value of the radius thereof. The slave device 3 receiving the value of the radius through this report can grasp a range of the area with the access restriction being unnecessary.

Similarly, the master device 2 defines at first a preferential area desired to be covered preferentially, and may select and use the frequency usable in the preferential area throughout. The master device 2, when selecting the frequency usable in the preferential area throughout, can report the preferential area as an area with the usability check being unnecessary.

On the other hand, such a case arises that the slave device 3 capable of receiving the report information from the master device 2 in the area other than the preferential area and determining by itself whether usable or unusable, can use the WS frequency enabling the slave device 3 to access the master device 2 outside the preferential area according to a result of the determination.

Moreover, Example 1 has exemplified the allowable transmission power as the slave device information. For example, when the antenna height of the slave device 3 is larger than a predetermined allowable value in comparison with other slave devices, e.g., when there is a circumstance causing the height to differ depending on the installing position, the slave device information may contain the antenna height of the slave device 3. While on the other hand, when the slave device 3 has a substantially fixed antenna height not depending on a usage as in the case of mobile equipment, it may be sufficient that the WS database server 1 retains a fixed value of the antenna height of the slave device 3.

Example 2

In Example 1, the master device 2 selects one frequency from the list of WS frequencies acquired from the WS database server 1, and reports the access restriction flag to the slave device 3. Example 2 is contrived to further enhance efficiency of the processing in Example 1. For example, the master device 2 may select a more proper frequency from the list of WS frequencies acquired from the WS database server 1 and may report the selected frequency to the slave device 3.

Other configurations and operations in Example 2 are the same as those in Example 1. Such being the case, the same components as those in Example 1 are marked with the same numerals and symbols, and the explanations thereof are omitted. Further, the device configurations and the functional configurations in Example 1 are to be applied directly to Example 2.

Figure 16:
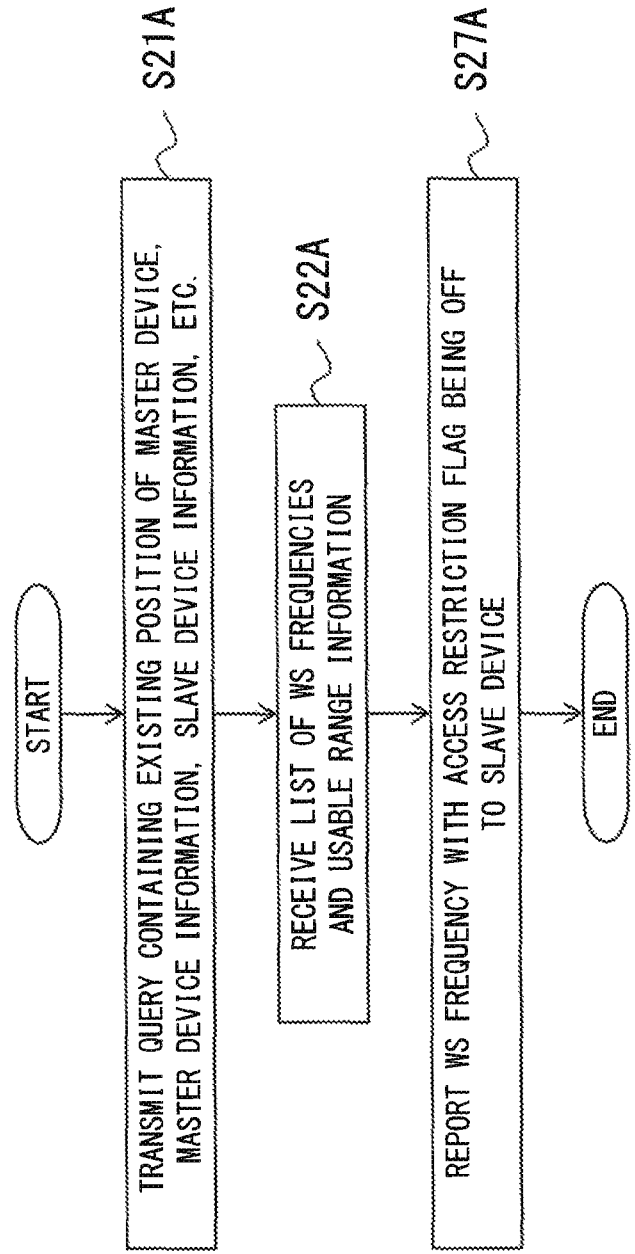
FIG. 16 is a flowchart illustrating processes of the master device according to Example 2.
Figure 17:
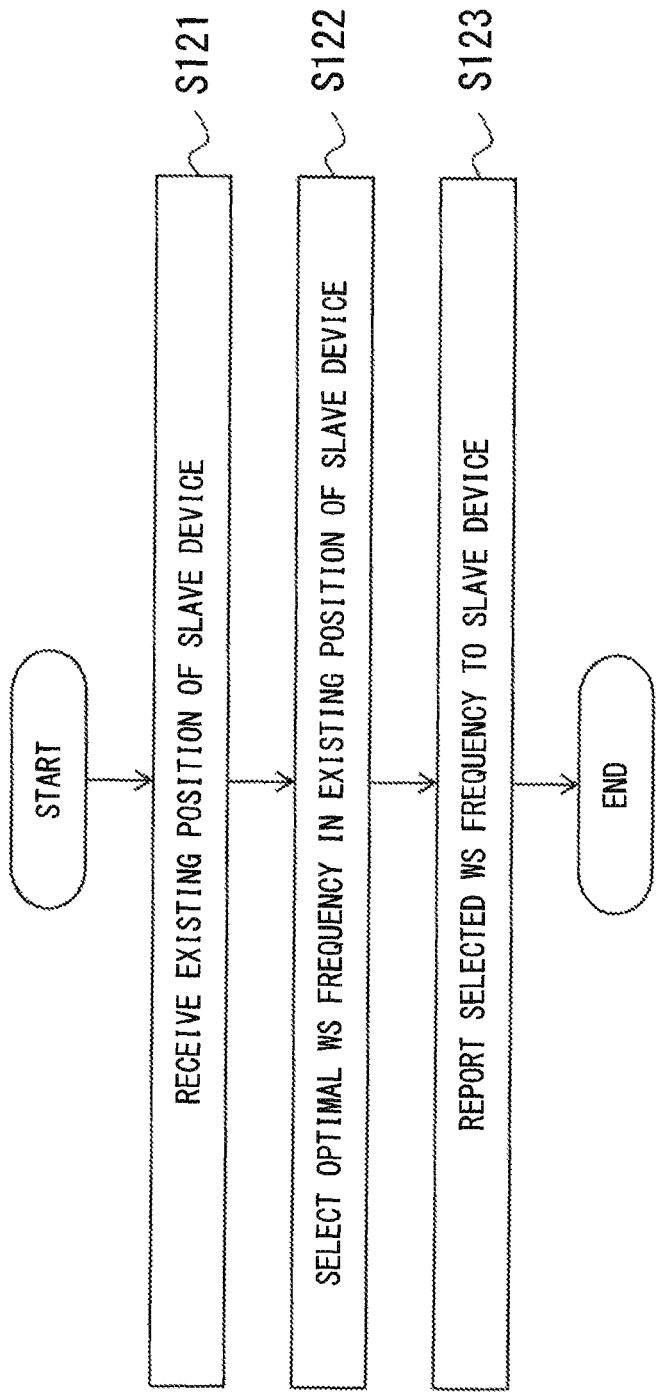
FIG. 17 is a flowchart illustrating processes of the master device according to Example 2.

FIGS. 16 and 17 are flowcharts illustrating processes of the master device 2 according to Example 2. In processes of FIG. 16, the master device 2 transmits the query containing the self existing position, the master device information, the slave device information, etc. to the WS database server 1 (S21A). Herein, the master device information contains, similarly to the device information in Example 1, the allowable transmission power, the antenna height, etc. of the master device 2. Further, the slave device information contains the allowable transmission power etc. of the slave device 3.

Next, the master device 2 receives the list of WS frequencies and the usable range from the WS database server 1 (S22A). Subsequently, the master device 2 transmits, to within the communication area, a report signal indicating that the access restriction flag is OFF by use of the WS frequency with the access restriction flag being OFF (S27A).

FIG. 17 is a flowchart illustrating processes of the master device 2 after the slave device 3 has connected with the master device 2 by using the frequency with the access restriction flag being OFF. In these processes, the master device 2 receives the existing position of the slave device 3 by employing the frequency with the access restriction flag being OFF (S121).

Next, the master device 2 selects the WS frequency estimated to be optimal in the existing position of the slave device 3 (S122). It may be sufficient that the master device 2 selects, on the occasion of selecting the WS frequency, the adequate WS frequency from a communication condition and a radio wave environment, and uses the selected WS frequency for the communication with the slave device 3. It may be sufficient that the master device 2 estimates an anticipated transmission rate per WS frequency usable in the existing position of the slave device 3 from, e.g., an interference condition and a congestive condition of the radio waves, and selects the WS frequency anticipated to exhibit the highest transmission rate as the optimal frequency.

Then, the master device 2 notifies the slave device 3 of the selected WS frequency by using the frequency with the access restriction flag being OFF (S123).

Figure 18:
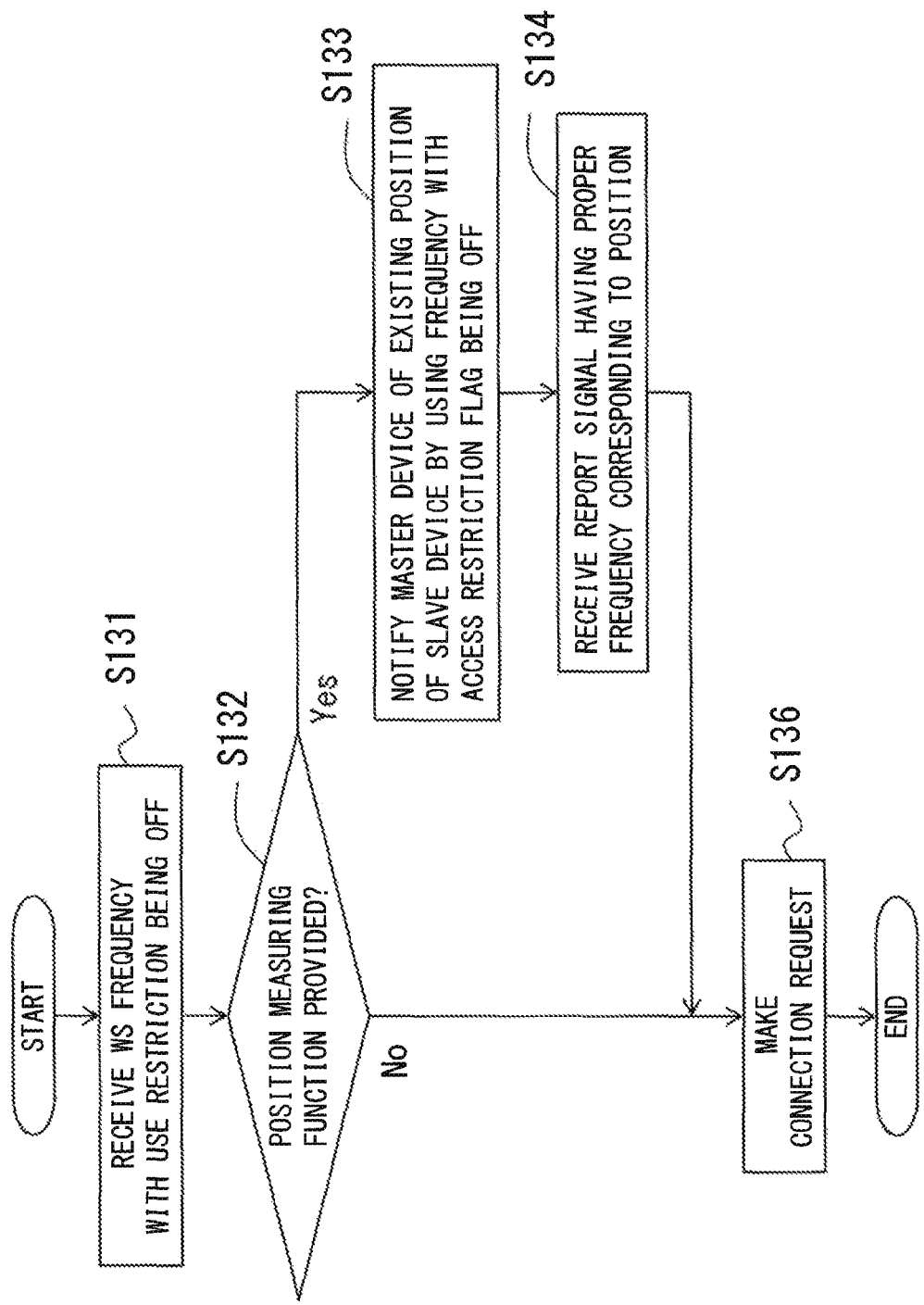
FIG. 18 is a flowchart illustrating processes of the slave device according to Example 2.

FIG. 18 is a flowchart illustrating processes of the slave device 3 according to Example 2. The processes in FIG. 18 are based on the premise that the master device 2 reports the frequency with the access restriction flag being OFF according to the processes in FIG. 16. Namely, the slave device 3 receives the report signal for reporting the WS frequency with access restriction flag being OFF from the master device 2 (S131).

Next, the slave device 3 determines whether a position measuring function is utilizable in the slave device 3 or not (S132). When the position measuring function is not utilizable, the slave device 3 requests the master device 2 to establish the connection by use of the WS frequency with the access restriction flag being OFF, which is reported in S131 (S136).

Whereas when the position measuring function is utilizable, the slave device 3 notifies the master device 2 of the existing position of the slave device 3 by use of the WS frequency with the access restriction flag being OFF (S133). Then, the slave device 3 receives the report signal of the proper frequency corresponding to the existing position from the master device 2 (S134). Subsequently, the slave device 3 requests the master device 2 to establish the connection by using the frequency reported in S134 (S136).

In the way described so far, in Example 2, the master device 2 and the slave device 3 can select the more proper WS frequency, e.g., the WS frequency anticipated to exhibit the highest transmission rate from within the plurality of WS frequencies usable in the existing position of the slave device 3 on the basis of the interference condition and the congestive condition of the radio waves. Then, the master device 2 and the slave device 3 can perform the communications within the range not affecting the primary system by use of the properly selected WS frequency in the plurality of WS frequencies.

Modified Example

In Example 2, the master device 2, similarly to Example 1, notifies the slave device 3 of one frequency with the access restriction flag being OFF, and receives the notification of the existing position of the slave device 3. In place of this process, however, the master device 2 may receive the notification of the existing position of the slave device 3 via the second network, e.g., the cellular network etc. that does not affect the primary system. Then, the master device 2 may select, similarly to Example 2, the proper frequency, and may notify the slave device 3 of the selected frequency via the second network.

Further, in Example 2, the master device 2 selects the proper WS frequency in the existing position of the slave device 3. As a substitute for this process, however, the slave device 3 may select the proper WS frequency in the self position. For example, it may be sufficient that the master device 2 transmits the list of WS frequencies to the slave device 3. It may be also sufficient that the slave device 3 selects the proper WS frequency, e.g., the WS frequency anticipated to exhibit the highest transmission rate in the WS frequencies usable in the existing position of the slave device 3.

Note that the master device 2 may transmit the access restriction flag from the single WS frequency by aggregating the respective access restriction flags related to the plurality of WS frequencies. For instance, it may be sufficient that the master device 2, upon receiving the existing position from the slave device 3, reports the list of WS frequencies with the access restriction flags being OFF in the existing position together with the information indicating that the access restriction flag is OFF to the slave device 3.

According to the communication system, in the system including the frequency notifying device as the master device and the wireless device as the slave device, it is feasible to enhance a possibility of employing a restricted frequency with its use being restricted in the communication area, and to effectively make use of the free frequencies.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management device comprising a processor configured to:
    receive, from a frequency notifying device, a query about usable frequencies containing a restricted frequency being restricted in use thereof by a wireless device in a predetermined communication area and a frequency not being restricted in use thereof by the wireless device in the predetermined communication area;
    extract the usable frequencies from a database;
    transmit, to the frequency notifying device, the usable frequencies and information indicating whether or not use of each usable frequency is restricted in the predetermined communication area;
    receive, from a wireless device having been notified of the restricted frequency being restricted in use in the predetermined communication area, a request for checking whether or not the restricted frequency notified of by the frequency notifying device is usable in position of the wireless device; and
    transmit, to the wireless device without intervening the frequency notifying device, a result of the checking whether or not the restricted frequency notified by the frequency notifying device is usable.

2. The management device according to claim 1, wherein the processor further configured to check, based on positional information of the wireless device and information about a degree of how much a wireless communication of the wireless device affects other wireless communications, whether the restricted frequency is usable by the wireless device, in response to the request received from the wireless device in the predetermined communication area.

* * * * *